United States Patent
Yeturu

(10) Patent No.: US 10,322,801 B1
(45) Date of Patent: Jun. 18, 2019

(54) UNMANNED AERIAL VEHICLE BASED SURVEILLANCE AS A SERVICE

(71) Applicant: Amazon Technologies, Inc., Seattle, WA (US)

(72) Inventor: Kalidas Yeturu, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 14/738,444

(22) Filed: Jun. 12, 2015

(51) Int. Cl.
*G05D 1/02* (2006.01)
*B64C 39/02* (2006.01)
*G05D 1/10* (2006.01)
*G08G 5/00* (2006.01)
*G01C 21/20* (2006.01)
*H04N 7/18* (2006.01)
*G06K 9/00* (2006.01)
*G06K 9/52* (2006.01)
*G06Q 10/08* (2012.01)

(52) U.S. Cl.
CPC .......... *B64C 39/024* (2013.01); *G06K 9/0063* (2013.01); *G06K 9/00771* (2013.01); *G06K 9/52* (2013.01); *G06Q 10/083* (2013.01); *H04N 7/181* (2013.01); *B64C 2201/127* (2013.01); *G06T 2207/30181* (2013.01); *G06T 2207/30232* (2013.01)

(58) Field of Classification Search
CPC ................ B64C 39/024; G06K 9/0063; G06K 9/00771; G06K 9/52; G06Q 10/083; H04N 7/181
USPC .......................................................... 348/144
See application file for complete search history.

(56) References Cited

U.S. PATENT DOCUMENTS

| | | |
|---|---|---|
| 6,509,926 B1 | 1/2003 | Mills et al. |
| 9,380,275 B2 | 6/2016 | Davidson, Jr. et al. |
| 9,905,009 B2 | 2/2018 | Akama |
| 9,928,553 B1* | 3/2018 | Harvey ............. G06K 9/00637 |
| 2007/0018887 A1 | 1/2007 | Feyereisen et al. |
| 2007/0092143 A1* | 4/2007 | Higgins ............. G06K 9/00785 382/228 |
| 2007/0159332 A1 | 7/2007 | Koblasz |

(Continued)

OTHER PUBLICATIONS

Office Action for U.S. Appl. No. 14/738,502, Yeturu et al., "Image Creation Using Geo-Fence Data", 11 pages.

(Continued)

*Primary Examiner* — Hee-Yong Kim
(74) *Attorney, Agent, or Firm* — Lee & Hayes, P.C.

(57) ABSTRACT

The delivery of a package using an unmanned aerial vehicle (UAV) may include performing a surveillance action at a property of an authorized party. The surveillance action may include imaging the property, and may be performed before or after the package is delivered. Surveillance data such as image data gathered in a surveillance action may be modified to remove or obscure adjacent properties not associated with the property of the authorized party. Based on surveillance data, the probability or confidence value of a surveillance event may be determined and a surveillance alert may be generated. Surveillance actions may be scheduled by a central controller to ensure that the surveillance action may be performed without exhausting the resources, such as battery power or time, of the UAV. Surveillance actions may be received as an interrupt and may have an associated priority level.

20 Claims, 11 Drawing Sheets

(56) References Cited

U.S. PATENT DOCUMENTS

| | | | |
|---|---|---|---|
| 2013/0182118 A1* | 7/2013 | Olker | H04N 7/185 348/158 |
| 2014/0027131 A1* | 1/2014 | Kawiecki | A62C 3/0242 169/45 |
| 2015/0140954 A1* | 5/2015 | Maier | H04W 4/22 455/404.2 |
| 2015/0234387 A1* | 8/2015 | Mullan | G05D 1/104 701/3 |
| 2015/0321758 A1* | 11/2015 | Sarna, II | B64C 39/024 244/63 |
| 2015/0344136 A1 | 12/2015 | Dahlstrom | |
| 2016/0133019 A1 | 5/2016 | Wagner et al. | |
| 2016/0159471 A1* | 6/2016 | Chan | B64C 39/024 244/39 |
| 2016/0182850 A1 | 6/2016 | Thompson | |
| 2016/0196756 A1* | 7/2016 | Prakash | B64C 39/024 701/3 |
| 2016/0219252 A1 | 7/2016 | Blanco et al. | |
| 2016/0232795 A1* | 8/2016 | Thiele | G05D 1/0022 |
| 2016/0246304 A1* | 8/2016 | Canoy | G05D 1/0816 |
| 2016/0373699 A1* | 12/2016 | Torres | G05D 1/0038 |
| 2017/0374323 A1* | 12/2017 | Gornik | H04N 7/185 |

OTHER PUBLICATIONS

Office Action for U.S. Appl. No. 14/738,502, Yeturu et al., "Image Creation Using Geo-Fence Data", 17 pages.
Office Action for U.S. Appl. No. 14/738,502, dated Jan. 5, 2018, Yeturu et al., "Image Creation Using Geo-Fence Data", 17 pages.
Office Action dated Jun. 12, 2018 for U.S. Appl. No. 14/738,502, Yeturu et al., "Image Creation Using Geo-Fence Data", 19 pages.
Office Action for U.S. Appl. No. 14/738,502, dated Oct. 25, 2018, Yeturu et al, "Image Creation Using Geo-Fence Data", 17 pages.

* cited by examiner

Fig. 8

UNMANNED AERIAL VEHICLE BASED SURVEILLANCE AS A SERVICE

BACKGROUND

Traditional home surveillance may include video cameras installed by a service provider to monitor a property. The viewpoint of these video cameras may be fixed or may have limited movable range and therefore the video cameras may miss important events. Additionally, with the large amount of video that can be captured, it is possible to miss important events. Furthermore, traditional ground-based surveillance systems may be vulnerable to manipulation or damage, for example, by an intruder. For example, an intruder may disable or break a ground-based video camera when the video camera is at a known location.

At the same time, as the delivery of packages using unmanned aerial vehicles (UAVs) becomes prevalent, UAVs traveling to and from a delivery destination may be leveraged to perform secondary tasks. With a variety of sensors aboard, including a digital camera, a UAV may be deployed to perform secondary tasks that are different than delivering a package to a destination and then returning directly back to an origination location.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is an illustrative user interface associated with determining parameters of a surveillance system.

DETAILED DESCRIPTION

This disclosure provides methods and systems for using an unmanned aerial vehicle (UAV) to perform a surveillance action of personal property that is verified as belonging to a user. For example, a UAV may have a primary role of delivering a package to a user. In the course of delivering the package, the UAV may determine whether it has available resources, and if so, the UAV may perform an additional scheduled surveillance action. In one embodiment, a surveillance action may include flying over a house of a different user who has consented to surveillance and gathering surveillance data, such as by recording video of the user's property while excluding adjacent properties (possibly by post-capture editing). After surveillance data has been gathered, the data may be analyzed to determine if there is a surveillance event. An example of a surveillance event may be the determination that a garage door was left open during the day, a broken window, a detection of graffiti, or a fire. In one embodiment, after a surveillance event has been determined, an alert may be provided to a user or a service provider.

In various embodiments, a user may subscribe to a surveillance system to provide surveillance as a service. The user may provide various parameters for the surveillance, such as a surveillance tier, frequency, monitoring type (e.g., sensors), and alerts. In some embodiments, a user may specify an object of interest for the surveillance system.

In various embodiments, surveillance data gathered by the UAV may be modified to present a geo-clipped image or video to a user. A geo-clipped image or video may be an image or video that has been modified by at least one location-based parameter. For example, a geo-clipped image or video may mask an image to show only those consented locations owned or controlled by a user. Such a geo-clipped image may ensure privacy of neighbors, for example. To access such a service, a user may have to submit proof of ownership or control of the location receiving surveillance, and possibly consent of other people residing at that location.

In various embodiments, a surveillance system may propose possible surveillance actions, and may include the proposed surveillance actions in a flight plan for a UAV. During the course of delivering a package, the UAV may evaluate its resources and select a surveillance action based on the UAV's available resources and a priority level of the surveillance action.

The techniques and systems described herein may be implemented in a number of ways. Example implementations are provided below with reference to the following figures.

Figure 1:
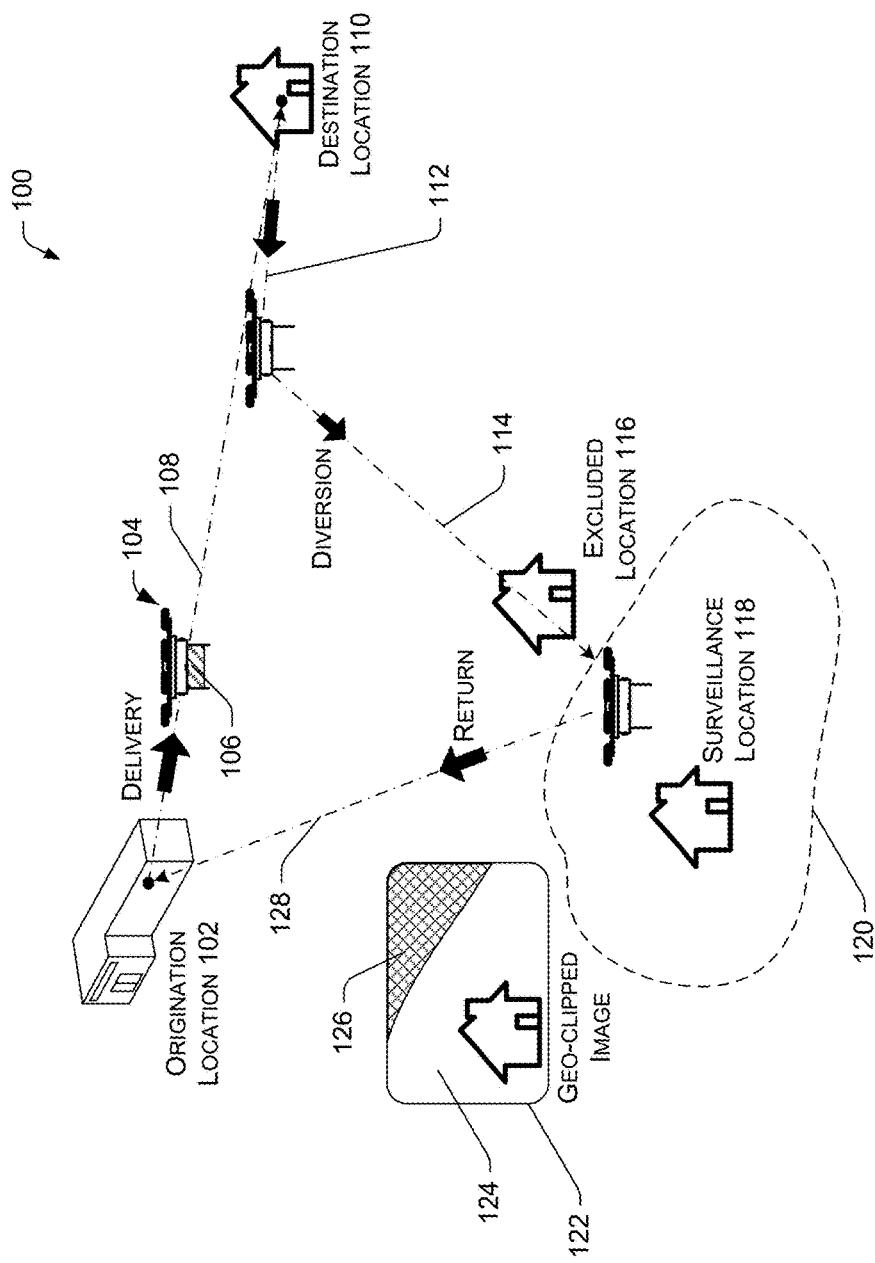
FIG. 1 is a schematic diagram showing an illustrative environment where an unmanned aerial vehicle may deliver a package as a primary task and provide surveillance as a service as a secondary task.

FIG. 1 is a schematic diagram showing an illustrative environment 100 where an unmanned aerial vehicle (UAV) may deliver a package as a primary task and provide surveillance as a service as a secondary task. The environment 100 may correspond to a delivery area where UAVs deliver inventory items to various destination locations. The UAV 104 may be dispatched to deliver a package 106 to a destination in the environment 100. The UAV 104 may begin its delivery mission from an origination location 102, such as a fulfillment center where inventory is stored, and may fly along a flight path 108 to a destination location 110. In some embodiments, the flight path 108 may be considered to be an outbound leg to deliver the package 106. The UAV 104 may continue on to another destination location if it is carrying multiple items that can be individually delivered to multiple destination locations.

After the package 106 has been delivered to the destination location 110, the UAV 104 may travel along a flight path 112 to return to the origination location 102. In some embodiments, the flight path 112 may be considered to be an inbound leg used to efficiently return the UAV 104 to the origination location 102. In some embodiments, the UAV 104 may divert from the flight path 112 and begin a new flight path 114, which may be referred to as a surveillance leg. Any number of events may trigger a diversion from a trip, such as a surveillance interrupt, or a determination that remaining resources of the UAV 104 are sufficient to conduct an approved surveillance action. Events triggering a diversion from a trip will be explained in connection with various figures of this disclosure. The surveillance action may include a minor deviation, or no deviation at all from the flight path 112 to return to the origination location 102.

The flight path 114 may direct the UAV 104 over one or more excluded locations 116 en-route to a surveillance location 118. The excluded location 116 may be adjacent to a surveillance location and may be a location that is not authorized or approved to receive surveillance, such as a location where owners, occupants, local ordinances, laws, or other people have not consented to or authorized surveillance. Alternatively, the excluded location 116 may be the subject of a separate surveillance action; however, relative to surveillance of the location 118, the location 116 may be an excluded location.

The surveillance location 118 may be defined by a geo-fence 120. A geo-fence may create a virtual perimeter or boundary around a real-world geographic area, such as area 120. The geo-fence 120 may correspond to a property line associated with the surveillance location 118, for example. A geo-fence may be pre-defined or may be dynamically defined. That is to say, the geo-fence 120 may be generated prior to a surveillance action or may be defined by property records, for example, or may be generated in real time during the surveillance action or any subsequent analysis.

When the UAV 104 arrives at the surveillance location 118, the UAV may perform a surveillance action, such as imaging the surveillance location 118. As will be described in reference to the various figures in this disclosure, a surveillance action may include still imaging, video capture, use of spectral cameras, audio surveillance, chemical surveillance, and/or other types of surveillance.

After the surveillance action is performed at the surveillance location 118 to gather surveillance data, the surveillance data may be analyzed and/or modified prior to access by a user. For example, in many instances, it may be difficult to gather surveillance data of the surveillance location 118 without inadvertently gathering surveillance data of excluded location 116, and it may be necessary to modify the data to remove data of the excluded location 116 from the surveillance data to protect the privacy of locations and people not associated with the service. In the illustrated embodiment, the surveillance data is modified to generate a geo-clipped image 122. The geo-clipped image 122 includes an authorized section 124 and an unauthorized section 126, which is masked or otherwise manipulated such that a user cannot view imagery of the unauthorized section 126. The unauthorized section 126 corresponds to a geo-clipped section that is not subject to surveillance, such as the excluded location 116, for example. In the illustrated embodiment, the authorized section 124 includes the surveillance location 118, as well as the surrounding area within the geo-fence 120.

After a surveillance action has been performed, the UAV 104 may receive or determine a new flight path, such as flight path 128, and may return to the origination location 102. Additionally, the UAV 104 may continue on to another destination location and/or another surveillance location.

Figure 2:
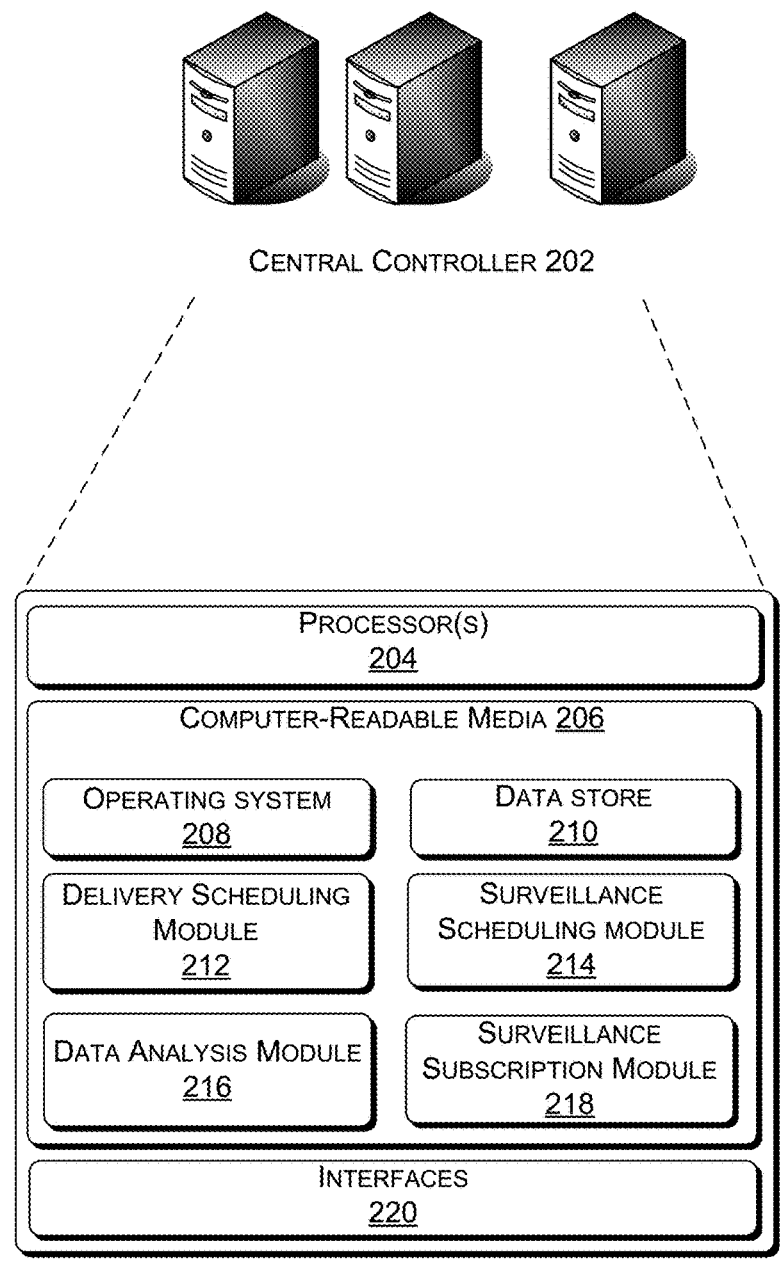
FIG. 2 is a block diagram of an example surveillance system.

FIG. 2 illustrates an example central controller 202. In various examples, central controller 202 can provide the exemplary process described with respect to FIG. 1. The central controller 202 may include one or more processor(s) 204 that interact with a computer-readable media 206. The computer-readable media 206 may include an operating system 208 and a data store 210 to store delivery data, surveillance data, scheduling data, or sensor data received from an UAV. In various embodiments, the data store 210 may store data received from the UAV 104. The computer-readable media 206 may also include software programs or other executable modules that may executed by the one or more processor(s) 204. Examples of such programs or modules include, but are not limited to, scheduling algorithms, surveillance algorithms, sensor algorithms, data analysis algorithms, network connection software, and control modules.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various embodiments, the computer-readable media 206 may include a delivery scheduling module 212. In various examples, the delivery scheduling module 212 may receive orders and schedule deliveries by a UAV to a destination location. The delivery scheduling module 212 may include a queue that receives orders and fulfills orders in the sequence they were received. In other examples, the delivery scheduling module 212 may fulfill an order based on a priority of the order, whether a package is ready to be delivered, weather conditions, or based on an availability of a UAV. In other examples, orders may be grouped together and scheduled to minimize total flight time.

In some embodiments, the delivery scheduling module 212 may determine delivery requirements, determine the amount of UAV resources to be used by the delivery, and determine an anticipated unused capacity of the UAV. In some embodiments, the delivery scheduling module 212 may determine delivery requirements and an anticipated unused capacity of an UAV for each order. Some of the described embodiments of the delivery scheduling module 212 are also discussed in connection with FIG. 7B and other figures of this disclosure.

In some embodiments, the delivery scheduling module 212 may determine that a particular delivery requires more resources than are available to a UAV. In this case, a delivery may not be scheduled, or may be rescheduled at another time.

In other examples, the delivery scheduling module 212 may schedule a delivery based at least in part on the surveillance scheduling module 214. For example, if a high priority surveillance action is to be performed, a delivery may be scheduled by the delivery scheduling module 212 to preserve available resources for the surveillance action.

In various embodiments, the computer-readable media 206 may include a surveillance scheduling module 214. In various examples, the surveillance scheduling module 214 may schedule an approved surveillance action based in part on the anticipated unused capacity determined by the delivery scheduling module 212. The surveillance scheduling module 214 may receive a request for a surveillance action by an authorized user, determine an anticipated amount of UAV resources required by the surveillance action (e.g., resource requirements such as a power requirement, a time requirement, or a sensor requirement), and schedule the surveillance action with a delivery action scheduled by the delivery scheduling module 212. The surveillance action is scheduled so that the surveillance action may be completed without exhausting the remaining resources of the UAV. In various embodiments, the surveillance scheduling module 214 includes a queue that receives multiple requests for surveillance actions, and schedules the surveillance actions based on a priority, the order the requests were received, the amount of anticipated resources required by the surveillance actions, and/or an amount of anticipated unused capacity determined by the delivery scheduling module 212.

In some embodiments, the surveillance scheduling module 214 may schedule multiple surveillance actions with a single delivery action. In some embodiments, the surveillance scheduling module 214 may schedule a surveillance action without performing a delivery scheduled by the delivery scheduling module 212.

In various embodiments, the computer-readable media 206 may include a data analysis module 216. In various examples, the data analysis module 216 may receive surveillance data and modify the surveillance data to generate geo-clipped surveillance data. For example, the geo-clipped surveillance data may be a geo-clipped still image or video, such as the geo-clipped image 122 of FIG. 1, or geo-clipped image 516 of FIG. 5A. In some embodiments, the data analysis module 216 may receive surveillance data, register surveillance data, and compare surveillance data with the registered surveillance data. In some embodiments, the data analysis module 216 may receive surveillance data and analyze the data to determine a surveillance event. Some of the described embodiments of the data analysis module 216 are also discussed in connection with FIG. 3 and other figures of this disclosure.

In various embodiments, the computer-readable media 206 may include a surveillance subscription module 218. In various examples, surveillance subscription module 218 may include a user interface such as user interface 800 in FIG. 8. Surveillance subscription module 218 may set surveillance parameters such as a surveillance tier, frequency, monitoring type, objects of interest, and alerts. In some embodiments, surveillance subscription module may determine subscription pricing, and accept payment information. As discussed in connection with this and other embodiments, the surveillance subscription module 218 may only be used to conduct surveillance of locations where a user is authorized to perform surveillance. For example, a user may have to submit proof of ownership or control of the location receiving surveillance, and possibly consent of other people residing at that location (e.g., in an apartment building). In this manner, the privacy of locations and persons is ensured.

In various embodiments, the scheduling system 202 includes one or more communication interfaces 220 for exchanging messages with an UAV, a surveillance location, a service provider, various user devices, and other networked devices. The communication interfaces 220 can include one or more network interface controllers (NICs), I/O interfaces, or other types of transceiver devices to send and receive communications over a network. For simplicity, other components are omitted from the illustrated device. In at least one embodiment, the communication interfaces 220 receive sensor data, including surveillance data, from the UAV.

Figure 3:
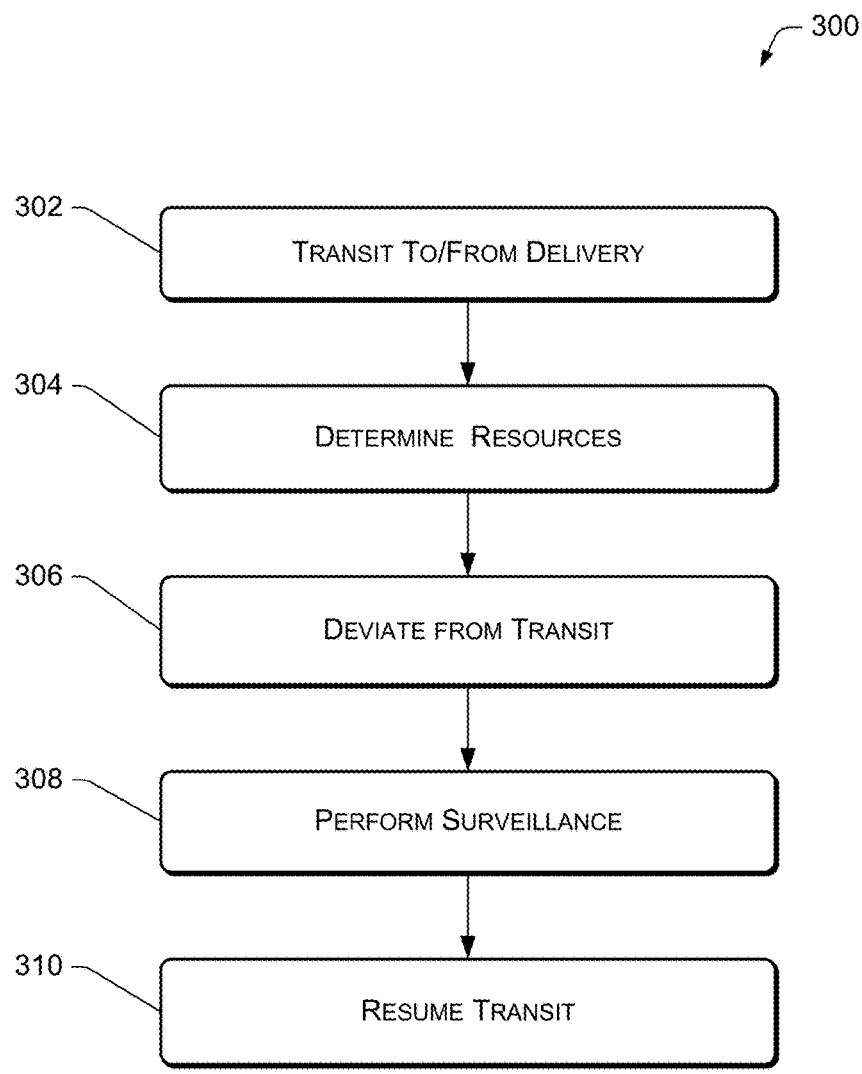
FIG. 3 is a flow diagram of an example process for performing surveillance while delivering a package with an unmanned aerial vehicle.

FIG. 3 is a flow diagram of an example process 300 for performing an approved surveillance while delivering a package with an unmanned aerial vehicle. In some embodiments, the process 300 may be performed by the central controller 202, the UAV 104, or both. Some of the operations in the process 300 may be performed in parallel or possibly in a different order than the order shown in FIG. 3.

At 302, a UAV may be in transit to or from a delivery. For example, the delivery may be a delivery of the package 106 to the destination location 110, as shown in FIG. 1. The example process 300 in FIG. 3 may be performed before or after a delivery has been performed, or may be performed between deliveries, if the UAV is capable of making multiple deliveries in a single trip.

At 304, the resources of the UAV may be determined. In some embodiments, resources of the UAV include a power resource, a sensor resource, or a time resource. For example, a power resource may indicate the remaining battery power or fuel levels for the UAV, and may also indicate an available range of the UAV. A sensor resource may indicate the status of the available sensors on the UAV, such as a digital camera, an available amount of memory for gathering surveillance data, or a communication capability. A time resource may indicate a time constraint on the UAV. For example, the UAV may be scheduled to deliver a package by a predetermined time, or the UAV may be scheduled to depart for its next delivery at a predetermined time. In some embodiments, the time resource may reflect a demand for a UAV at a fulfillment center. Determining the resources of the UAV may also include determining the resources required by a delivery action, and/or determining the resources required by a surveillance action. The resources to be determined may be resources used or resources anticipated to be used. In some embodiments, the determination is based in part on environmental factors such as the weather, including wind speed, direction, a weather forecast, temperature, time, etc. In some embodiments, determining the resources may also include determining a priority of a resource, a delivery action, or a surveillance action.

At 306, the UAV may deviate from transit. Included with deviating from transit, operation 306 may also include a determination that sufficient resources are available for a surveillance action. Deviating from transit may include computing a new flight path or may include selecting a previously computed flight path. Deviating from transit may also include selecting a surveillance action from one or more possible surveillance actions. Deviating may include changing speed, heading, and/or altitude. An example of deviating from transit is shown as the flight path 114 in FIG. 1.

At 308, the UAV may perform a surveillance action. In some embodiments, a surveillance action includes taking still images or video of a surveillance location, such as the surveillance location 110. Various examples of surveillance actions include using any sensors 904 of UAV 902, such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof. Furthermore, surveillance actions are described in detail in connection with the various figures in this disclosure.

At 310, the UAV may resume transit, which may include continuing with a delivery, aborting a delivery, returning to an origination location of the UAV, or traveling to another location. Operation 310 may further include determining resources remaining after performing a surveillance action, in order to determine a flight path to resume.

Figure 4:
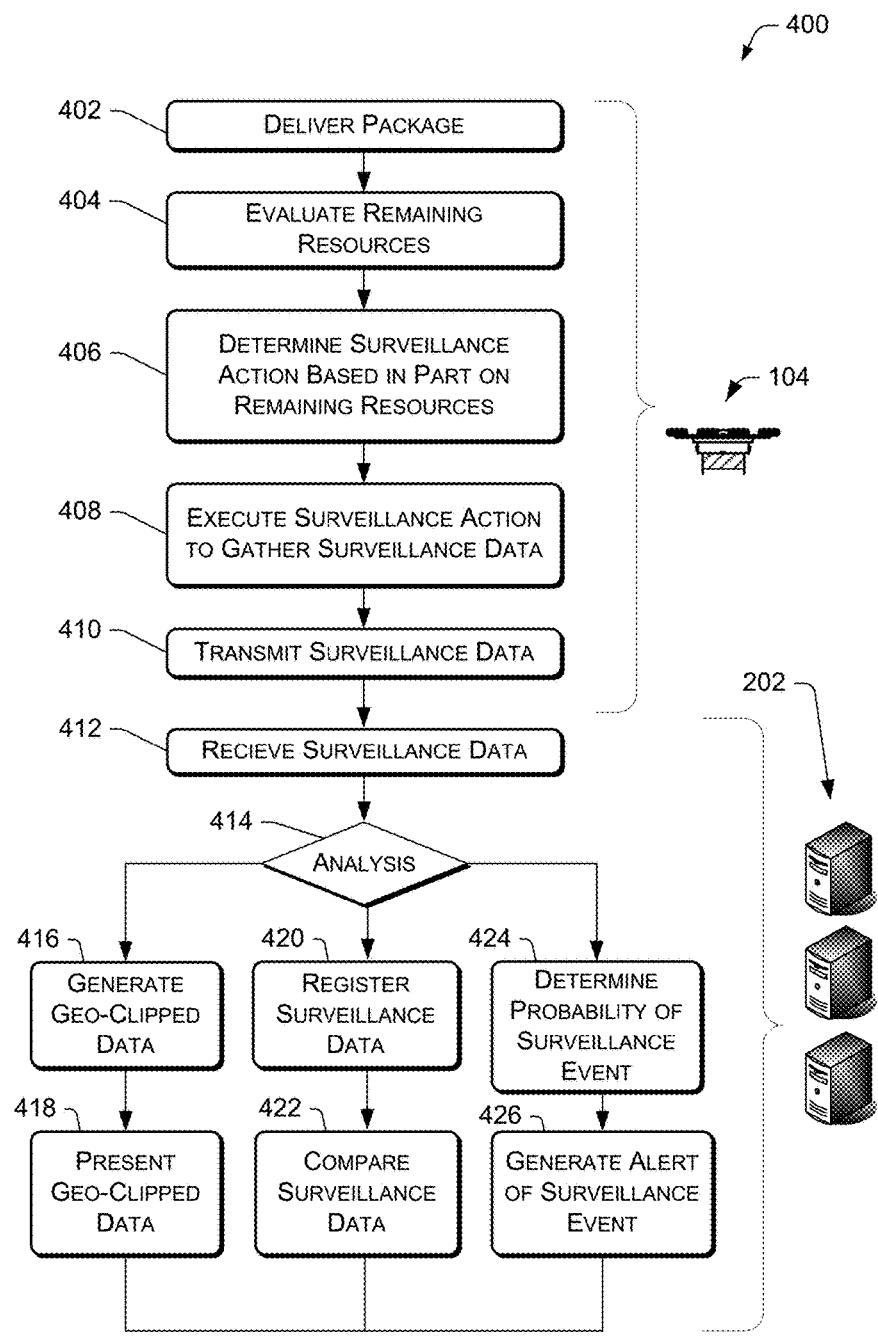
FIG. 4 is a flow diagram of an example process for performing surveillance while delivering a package with an unmanned aerial vehicle.

FIG. 4 is a flow diagram of an example process 400 for performing surveillance while delivering a package with an unmanned aerial vehicle.

In some embodiments, operations 402-412 may be performed by a UAV, such as the UAV 104, while operations 414-426 may be performed by the central controller 202. In some embodiments, the UAV 104 may perform all operations, or the UAV 104 and the central controller 202 may perform operations 402-426 in any combination, as would be understood by a person of ordinary skill in the art. Some of the operations in the process 400 may be performed in parallel or possibly in a different order than the order shown in FIG. 4.

At 402, the UAV 104 delivers a package at a destination location. In some embodiments, the UAV 104 may continue on to another destination location if it is carrying multiple items that can be individually delivered to multiple destination locations.

At 404, the UAV 104 evaluates its remaining resources. In some embodiments, evaluating remaining resources includes evaluating an available range of the UAV, such as remaining battery power or fuel levels; evaluating the available sensors, such as a digital camera, an available memory, or a communication capability; or evaluating a remaining time to perform a delivery action within a delivery window, or to perform a surveillance action within a surveillance window. In some embodiments, evaluating remaining resources in operation 404 may correspond to the operation of determining resources in operation 304.

At 406, a surveillance action is determined based in part on the remaining resources of the UAV. A surveillance action may include a deviation from transit (such as a deviation from delivering a package or returning to an origination location), gathering surveillance data (such as imaging a surveillance location), and/or a return flight path (such as returning to an origination location of the UAV). In some embodiments, determining the surveillance action includes selecting a surveillance action from one of many surveillance actions proposed by a surveillance system. In some embodiments, the surveillance action may be received as an interrupt. In some embodiments, determining the surveillance action is based at least in part on the remaining resources of the UAV. As range is often a limiting factor in UAV travel, determining the surveillance action may include selecting a surveillance action that may be completed in the remaining available range of the UAV (i.e., without exhausting the resources of the UAV). In various examples, determining the surveillance action may be based on a time constraint (e.g., such as a time constraint to deliver a package, perform a surveillance action, return to an origin, or a subsequent delivery and/or surveillance action), a priority of a surveillance action, the surveillance data to be gathered, environmental factors including the weather, the physical proximity of a plurality of surveillance actions (i.e., the opportunity to complete multiple surveillance actions), noise restrictions, flight path restrictions, surveillance restrictions, future expected surveillance actions, and/or future expected deliveries.

At 408, the surveillance action is executed to gather surveillance data. In various examples, surveillance data may be any data gathered by the sensors 904, such as such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof.

At 410, surveillance data is transmitted. As described above, in some embodiments, operations 402-410 are performed by the UAV 104, while operations 412-426 are performed by the central controller 202. Therefore, in some embodiments, operation 410 includes transmitting surveillance data from the UAV 104 to the central controller 202. In some embodiments, the surveillance data is transmitted via interfaces 934 of FIG. 9. For example, the surveillance data may be transmitted wirelessly over a network and directed to its destination, as would be understood by a person of ordinary skill in the art. The surveillance data may be transmitted as compressed or uncompressed data, or may be transmitted with or without encryption. In some embodiments, the surveillance data is transmitted in real time. In some embodiments, the surveillance data may be transmitted to multiple recipients, such as the central controller 202, another UAV, a user device, or a service provider. In some embodiments, geo-clipped data is transmitted (instead of or in addition to surveillance data).

At 412, the surveillance data transmitted in operation 410 is received. In some embodiments, the surveillance data is received by central controller 202. As one example, interfaces 220 of central controller 202 receive surveillance data. As described above, the surveillance data may be received as compressed or uncompressed data, or may be received with or without encryption. In an embodiment where operations 402-426 may be performed in a single device, transmitting and receiving the surveillance data may not be needed, and may be omitted. However, even in an embodiment where operations 402-426 may be performed in a single device, surveillance data and/or geo-clipped data may be transmitted to or received by another device.

At 414, an analysis of the surveillance data may begin. Analysis operations 416, 418, 420, 422, 424, and 426 may be performed in serial, in parallel, individually, or in any combination. Additionally, operations 416, 418, 420, 422, 424, and 426 may be repeated with respect to the surveillance data, and may be performed continuously on incoming streams of surveillance data, for example. In some embodiments, the analysis is performed automatically, such as via a machine vision algorithm; in some embodiments, the analysis may be performed by a human analyst; and in some embodiments, certain aspects of the analysis may be performed automatically, and certain aspects may be performed by a human analyst.

At 416, geo-clipped data is generated. The geo-clipped data may be the same as or similar to the geo-clipped image 122 described in FIG. 1. In some embodiments, the geo-clipped data may be surveillance data that has been modified based on at least one location parameter. As discussed above, the surveillance data may include data referring to one or more excluded locations 116 and surveillance location 118. In some embodiments, the surveillance location 118 is defined by the geo-fence 120. In operation 416, the surveillance data is modified in order to exclude, blur, obscure, excise, mask, or hide data referring to the excluded location 116. Generating geo-clipped data may include surveillance data gathered using sensors 904. For example, geo-clipped data may include data from digital camera(s) 906 and GPS sensor(s) 914. In this example, the data from GPS sensor(s) 914 may be used to determine which portions of image data from digital camera(s) 906 refer to the surveillance location 110, and which portions of the image data refer to the excluded location 116. An example of generating geo-clipped data can also be seen in FIGS. 5A, 5B, and 6.

At 418, the geo-clipped data is presented. In some embodiments, presenting geo-clipped data includes displaying a geo-clipped image on a screen, for example. A non-exhaustive list of presenting geo-clipped data includes presenting via an internet browser, an application, as a data file (such as a JPEG or MP4 file), in an email, as an attachment to an email, as a text message, as a hardcopy, and as portable media. In some embodiments, the geo-clipped data may be presented on a display in real time, while in other embodiments, the geo-clipped data may be presented in a file repository accessible via an internet browser.

At 420, the analysis includes registering the surveillance data. In this operation, surveillance data of a surveillance location is stored in a memory. In some embodiments, the surveillance data relating to the same surveillance location is gathered and stored to build a database of registered surveillance data. In some embodiments, registering the surveillance data includes identifying objects of interest in a surveillance location. As a non-limiting example, an object of interest may be the presence or absence of a physical feature, such as a car in a driveway at a surveillance location. In some embodiments, an object of interest may be identified automatically or manually, such as by a user or an operator. An example of identifying an object of interest is described in connection with FIG. 8.

At 422, the surveillance data is compared. This operation includes comparing incoming surveillance data with the surveillance data registered in operation 420. In some embodiments, a machine vision program compares incoming surveillance data with the registered surveillance data to determine state changes between the registered surveillance data and the incoming surveillance data. In the example described above, surveillance data was registered, which includes the identification of an object of interest, such as a car in a driveway. As the surveillance data is compared, a machine vision algorithm may determine a state change of the car in the driveway. Various examples of the state changes of the car in the driveway include whether the car is present, the location of the car in the driveway, whether the lights of the car are illuminated, or whether a window of the car is intact or broken. In some embodiments, operations 420 and/or 422 include machine learning and/or machine vision algorithms in its analysis.

At 424, the analysis includes determining the probability or confidence value of a surveillance event. In some embodiments, a surveillance event is a disturbance or an important event warranting a surveillance alert. Some non-limiting examples of a surveillance event include an event such as a property breech, an open door or garage door, a fire, or a broken window. Events qualifying as a surveillance event may be set in advance, may be set automatically, or may be determined from predefined criteria. In some embodiments, a surveillance event may be manually indicated by a user. In some embodiments, it may be difficult to determine the state of a surveillance event (e.g., whether an intruder is in a surveillance location). Therefore, in some embodiments, a probability or confidence value is determined that the perceived surveillance event is occurring or has occurred. For example, if a fire is directly observed in surveillance data, it may be determined with 100% probability that the surveillance location is on fire. In another example, if a window on a property is broken, and an unknown vehicle is observed outside a house, the probability of an intruder in the house may be high, but possibly less than 100% certain. In some embodiments, determining the probability or confidence value of a surveillance event may be based in part on the comparison of surveillance data with registered surveillance data, as described in operations 420 and 422. In other embodiments, determining the probability of a surveillance event is based in part on machine learning, machine vision, and/or determined automatically or by a user or operator.

At 426, an alert is generated corresponding to a surveillance event. Non-limiting examples of an alert include alerts by telephone, email, text message, or through an alert application. An alert may be provided to multiple recipients, such as a service provider (such as a security provider), an operator, a user, or a municipal entity such a police or fire department. In some embodiments, alerts may be provided to a UAV, for example, as an interrupt or a surveillance action. In some embodiments, the alerts may depend on the type of surveillance event. For example, if the surveillance event is the determination that a garage door was left open, an alert may be a text message to a user, while if the surveillance event is a fire, an alert may be a text message or telephone call to a security provider or fire department. In some embodiments, the generated alert may be based in part on whether the probability of the surveillance event is above a threshold. In some embodiments, the threshold may be set automatically or by a user. In some embodiments, alerts may be automatically set or may be defined by a user. In some embodiments, an alert may be used to annotate a geo-clipped image to identify the surveillance event, such as with an arrow, a marker, or a color to draw a user's attention to the surveillance alert. Surveillance alerts are discussed in more detail in connection with FIG. 5B and FIG. 8.

Figure 5A:
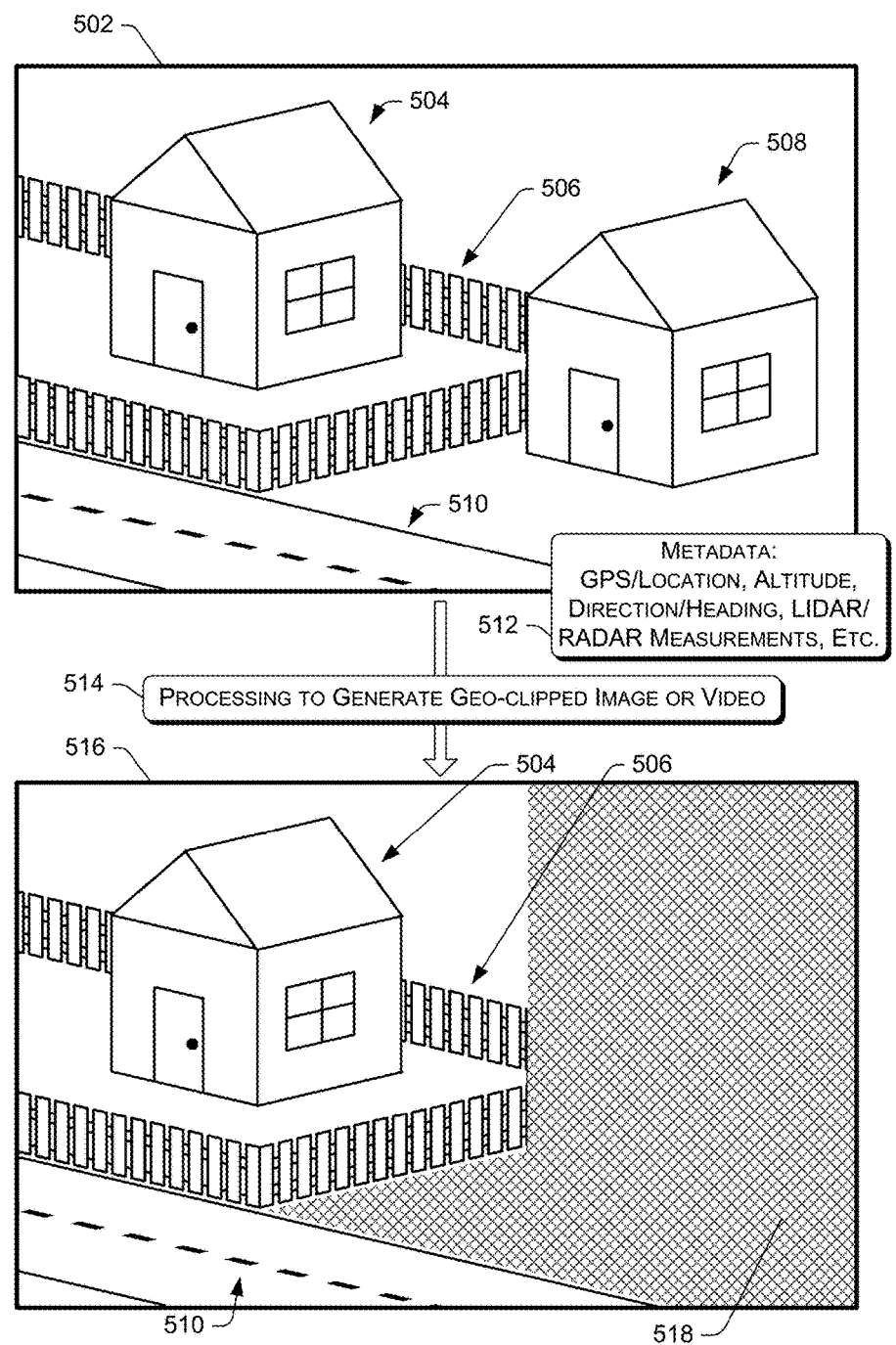
FIG. 5A is a schematic diagram illustrating a surveillance image, processing of the surveillance image, and a post-processing surveillance image, in accordance with one embodiment disclosed herein.

FIG. 5A is a schematic diagram illustrating a surveillance image, processing of the surveillance image, and a post-processing surveillance image, in accordance with one embodiment disclosed herein.

A surveillance image 502 is an example of surveillance data generated by the one or more sensors 904 of UAV 902. For example, the surveillance image 502 may be an image generated by digital camera(s) 906, spectral camera(s) 908, LIDAR/RADAR 912, or any combination thereof. The surveillance image 502 may be a still image or may be a video.

In some embodiments, the surveillance image 502 includes within its frame images of a surveillance location 504, a surveillance location fence 506, and an excluded location 508. In some embodiments, the surveillance location 504 may correspond with the surveillance location 118; the surveillance location fence 506 may correspond with the geo-fence 120; and the excluded location 508 may correspond with the excluded location 116. In some embodiments, surveillance image 502 may include public property (such as a street 510), or any property or object beyond the surveillance location 504 or the excluded location 508.

In some embodiments, the surveillance location fence 506 may correspond partially with the geo-fence 120. In some embodiments, the surveillance location fence 506 may not completely define the boundaries of a surveillance region, and instead, a generated geo-fence may be larger or smaller than the surveillance location fence 506. In some embodiments, a geo-fence may include the surveillance location as well as any public land or private land open to the public. In some embodiments, data defining a geo-fence may include one or more location parameters.

The surveillance image 502 may also include metadata 512 associated with the surveillance image 502. In various examples, the metadata 512 refers to the conditions of the UAV at the time the surveillance image 502 was generated, and may include GPS data or location data, altitude data of the UAV, direction and heading information of the UAV, and LIDAR/RADAR measurements of the UAV to each object in the surveillance image 502. The metadata 512 may also include information relating to a particular sensor used to generate the surveillance image 502. For example, if digital camera(s) 906 was used to generate the surveillance image 502, the metadata 512 may also include information relating to camera settings, such as focal length, aperture, shutter speed, metering mode, ISO speed, lighting conditions, timestamp, and/or image resolution. In some embodiments, the metadata 512 may include inertial information of the UAV, such as accelerometer information in three dimensional space. In some embodiments, the metadata 512 may include information such as UAV identification information (e.g., a unique UAV identification number), sensor information (e.g., make, model), environmental information (e.g., weather), flight information, delivery action information, and surveillance action information.

At 514, processing is performed to generate a geo-clipped image or video. In some embodiments, the processing in operation 514 may correspond to the processing in operation 416. In some embodiments, the processing in operation 514 may be performed by the UAV 104, the central controller 202, or a combination thereof.

Processing to generate the geo-clipped image or video 514 includes receiving the surveillance image 502, determining which portion of the surveillance image 502 is to be geo-clipped, and generating a geo-clipped image or video. In some embodiments, determining which portion of the surveillance image 502 to be geo-clipped is based in part on determining a geo-fence for the surveillance location 504. For example, the geo-fence for the surveillance location 504 may be based on the surveillance location fence 506, or other information to establish a virtual barrier or boundary corresponding a real-world geographic area. In some embodiments, a geo-fence for surveillance location 504 is generated dynamically (e.g., such as in real time while processing 514 is performed), and in some embodiments, a geo-fence for surveillance location 504 may be based on a predetermined set of boundaries.

In some embodiments, a machine vision algorithm analyzes the surveillance image 502, the metadata 512, and a geo-fence associated with the surveillance location 504 to determine what portion of the surveillance image 502 is to be geo-clipped. For example, a machine vision algorithm may use the metadata 512 to determine the location of the UAV relative to the geo-fence associated with the surveillance location 504, determine whether the surveillance image 502 includes the surveillance location 504 or the excluded location 508, and determine what portion of the surveillance image 502 should be geo-clipped. For example, if the surveillance image 502 contains images of the excluded location 508, the surveillance data 502 may be modified to obscure the excluded location 508. In some embodiments, the surveillance image 502 may only contain images of the surveillance location 504, and no portion of the surveillance image 502 may need to be obscured. In some embodiments, a geo-clipped image can be generated automatically, by an operator, or some combination thereof. For example, an operator may verify that a machine vision algorithm has correctly geo-clipped the surveillance image 502. Processing to gather or generate surveillance data is discussed in more detail in connection with FIG. 6.

One example of a result of processing to generate a geo-clipped image or video is shown as geo-clipped surveillance image 516. As a non-limiting example, the geo-clipped surveillance image 516 includes the surveillance location 504 and the surveillance location fence 506. In some embodiments, the geo-clipped surveillance image 516 includes a geo-clipped portion 518. The portion 518 is shown as covering the excluded location 508. In some embodiments, the portion 518 may cover all portions of the image beyond the surveillance location 504, defined in part by the surveillance location fence 506. In some embodiments, the geo-clipped portion 518 may only cover private property, such as excluded location 508, and may not cover public property such as street 510. In some embodiments, the geo-clipped portion is generated in compliance with all Federal, State, Municipal, and local laws, including those regarding rights of privacy and rights of publicity. As a non-limiting example, the geo-clipped portion 518 is shown as obscured with a pattern. However, in some embodiments, the geo-clipped portion 518 may be represented as any color, with any level of translucency or distortion that prevents view of specific objects or people in the unauthorized areas depicted in imagery. In some embodiments, the geo-clipped portion 518 may be represented using pixelation, fogging, blur effects, posterization, censor bars, obscuring the area with pixels of a constant color, removal of the area, cropping the area, or obscuring the area with random colors. Processing to generate a geo-clipped image or video is discussed in more detail in connection with FIG. 6.

After the processing 514 has been performed to generate the geo-clipped surveillance image 516, the geo-clipped surveillance image 516 may be presented. In some embodiments, presenting the geo-clipped surveillance image 516 may correspond to operation 418.

Figure 5B:
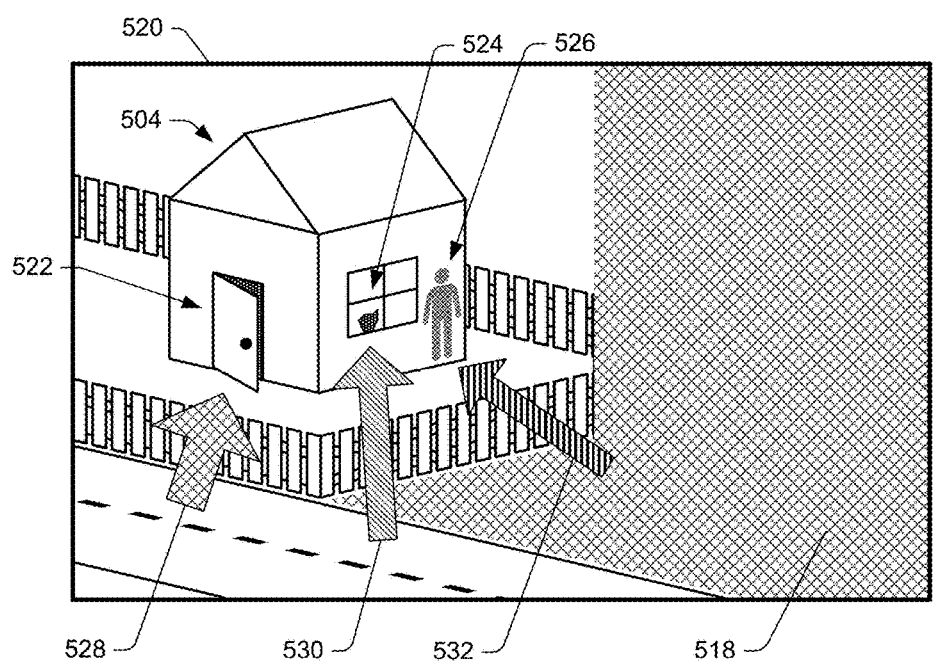
FIG. 5B is a schematic diagram illustrating a post-processing surveillance image, surveillance events, and surveillance alerts, in accordance with one embodiment disclosed herein.

FIG. 5B is a schematic diagram illustrating a post-processing surveillance image, surveillance events, and surveillance alerts, in accordance with one embodiment disclosed herein. For simplicity, some numbering shown in FIG. 5A has been omitted from FIG. 5B.

A geo-clipped surveillance image 520 shows an example of surveillance events 522, 524, and 526 occurring at surveillance location 504. For example, surveillance event 522 may correspond to a door of the surveillance location 504 being open. Surveillance event 524 may correspond to a broken window at surveillance location 504. Surveillance event 526 may correspond to a person detected at the surveillance location 504. In some embodiments, the surveillance events 522 and 524 may be detected using digital camera(s) 906 of the UAV 902. In some embodiments, the surveillance event 526 may be detected using spectral camera(s) 908 of UAV 902, and may correspond to a thermal image of a person detected behind a wall of the surveillance location 504. As shown in the geo-clipped surveillance image 520, sensor data may be layered to show data corresponding to the digital camera(s) 906 and the spectral camera(s) 908 in the same image.

Surveillance events 522, 524, and 526 may be identified in the surveillance image 520 by surveillance alerts 528, 530, and 532. For example, the surveillance alerts 528, 530, and 532 may serve to identify the location and probability or confidence value of the surveillance event occurring at the surveillance location 504. As discussed in connection with FIG. 4, the sensors 904 may gather surveillance data of the surveillance location 504, and a machine vision algorithm and/or human analysis may process or review the surveillance data to determine the probability or confidence value of a surveillance event, which is shown as an open door 528. Because the open state of the door may be observed directly, the probability or confidence value of this surveillance event may be high, and the surveillance image 520 may be modified to identify the surveillance event 522 with the surveillance alert 528. The surveillance alert 528 corresponding to the surveillance event 522 may represent the location, severity, confidence value, and/or risk associated with the surveillance event 522. For example, although the surveillance alert 528 is shown as a patterned arrow in FIG. 5B, the surveillance alert may be represented as a colored highlighting of the surveillance image 520, or any other method to indicate the surveillance event.

As discussed above, surveillance event 526 may correspond to a person detected at the surveillance location 504 via the spectral camera(s) 908 of UAV 902. In some embodiments, the confidence value of the surveillance event 532 may be higher or lower than the confidence value of surveillance events 528 or 530, and the surveillance alert 532 corresponding to surveillance event 526 may be represented accordingly. For example, if arrows are used to represent the surveillance alerts 528, 530, and 532, the length, width, color, pattern, etc. of the arrow may be modified to represent the type, confidence value, severity, level of risk, immediacy, etc. of the surveillance event. In some embodiments, if a translucent color is used as the surveillance alert to indicate the surveillance events, the color, size, level of translucency, etc. may be modified to represent various factors of the surveillance event.

In some embodiments, the geo-clipped surveillance image 520 may be presented to a user, service provider, security company, etc. in real time, with a time delay, or in any suitable format. In some embodiments, the surveillance image 520 is an example of a surveillance image to be presented in operations described elsewhere in this specification. If the surveillance image 520 is presented to a user in a display or user interface, in some embodiments, the user may select the surveillance alerts 528, 530, or 532 and may receive additional information regarding the surveillance event. For example, if a user selects the surveillance alert 528, information about the surveillance event 522 may be provided, such as a description of the surveillance event 522, when the surveillance event 522 was detected, or the probability or confidence value of the surveillance event 522. In some embodiments, the user may be presented with an option to view surveillance data previously registered in the central controller 202, for example, to view the surveillance location 504 before the surveillance event 522 was detected. In some embodiments, the user may be presented with options to alert a service provider or a municipal entity, or the user may be presented with a user interface to identify an object of interest or to add or modify surveillance parameters for additional surveillance. In some embodiments, for a surveillance event such as a broken window 524, selecting the surveillance alert 530 may bring up options available to the user to remedy or fix the situation, such as advertisement for a window repair service. In some embodiments, the user may be presented with a user interface similar to that shown in FIG. 8.

Figure 6:
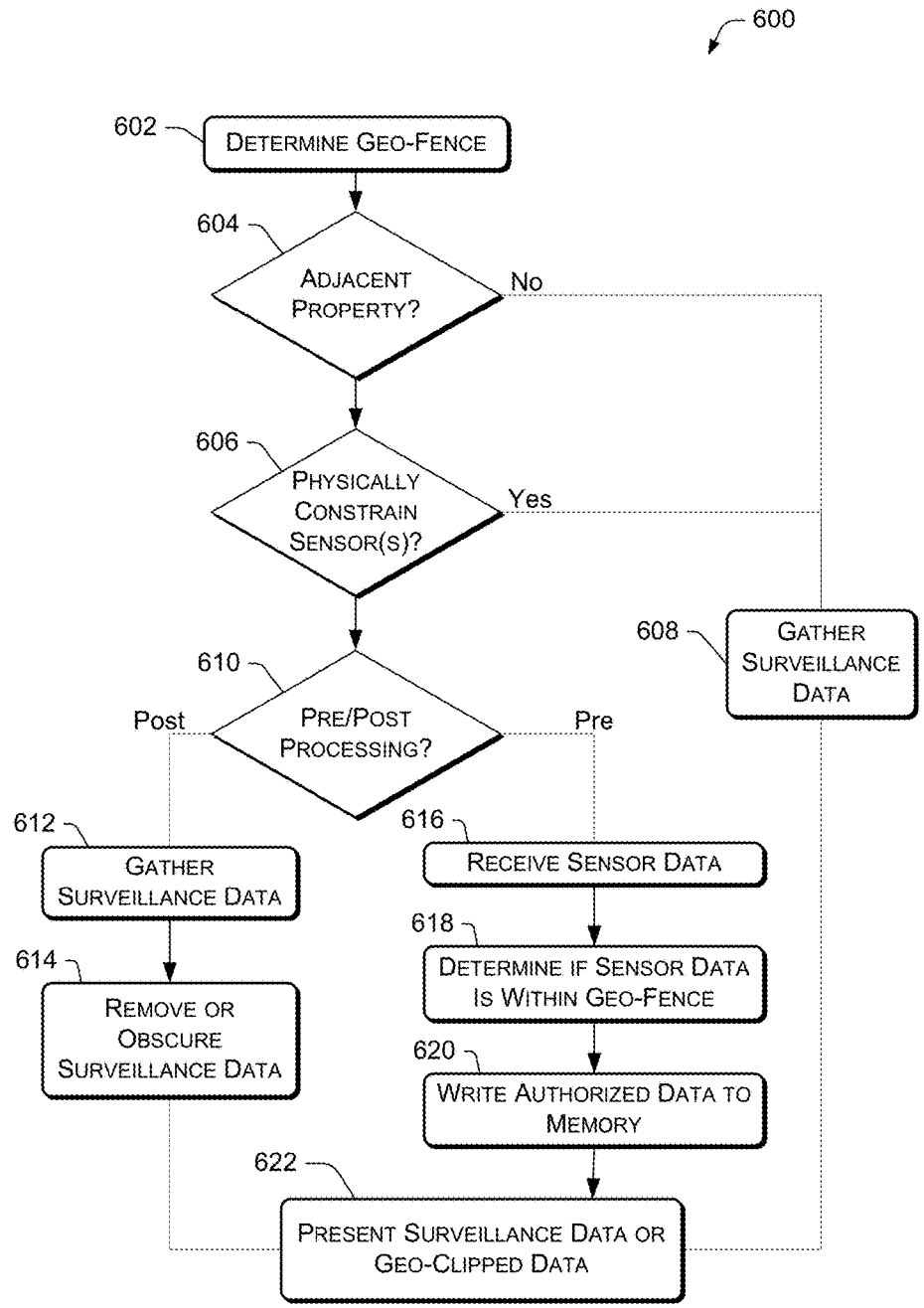
FIG. 6 is a flow diagram of an example process for processing surveillance data.

FIG. 6 is a flow diagram of an example process 600 for generating surveillance data.

In some embodiments, operations 602-622 may be performed by a UAV, such as the UAV 104, during a surveillance action, while in some embodiments, the UAV 104 and the central controller 202 may perform operations 602-622 in any combination, as would be understood by a person of ordinary skill in the art. Some of the operations in the process 600 may be performed in serial, in parallel, individually, in any combination, or possibly in a different order than the order shown in FIG. 6. Additionally, operations 602-622 may be performed continuously during a surveillance action, for example.

At 602, a geo-fence is determined. The geo-fence may be the same as or similar to the geo-fence 120 described in FIG. 1, or the geo-fence described in connection with FIGS. 5A and 5B. In some embodiments, the geo-fence and/or geo-fence data is determined by the central controller 202 in response to receiving a surveillance location from a user. In some embodiments, the geo-fence is based on physical constraints of a surveillance location, and/or is based on portions of a surveillance location where a user has provided authentication or verification that they are an authorized party to perform surveillance (e.g., an authorized area). For example, a geo-fence may provide a boundary between a surveillance location (such as surveillance location 504) and an adjacent location (such as excluded location 508, or an unauthorized area). In some embodiments, the geo-fence is determined dynamically (e.g., in real time) by the UAV during a surveillance action based on information received from sensors 904, such as GPS sensor(s) 914 and LIDAR/RADAR sensor(s) 912.

At 604, a determination is made whether an adjacent property is present. Operation 604 may include using sensors 904, such as digital camera(s) 906, to view the surveillance location and to determine that no adjacent property (such as excluded location 116 or 508) is present. In some embodiments, a surveillance location may be a remote location where no excluded locations are nearby, while in some embodiments, a surveillance location may be so large that no excluded locations may be observed. In some embodiments, a surveillance location may be surrounded by public land or property, private property open to the public, or a user may have received consent from owners of adjacent property. If no adjacent property is present (operation 604, "No"), surveillance data may be gathered in operation 608, as described in connection with various embodiments. If an adjacent property is determined to be present in operation 604, processing continues to operation 606.

At 606, a determination is made whether it is possible to physically constrain sensor(s). For example, if the digital camera(s) 906 are used, the digital camera(s) may be turned off to avoid the adjacent property until a time in which the UAV is in a location where surveillance data would not be gathered of the adjacent property (i.e., a state of a sensor may be changed). In some embodiments, the digital camera(s) 906 may be zoomed in to only observe the surveillance location, or an aperture of the digital camera(s) 906 may be set and the digital camera(s) 906 may be focused such that the adjacent property may be physically blurred, for example, using a technique such as bokeh. In some embodiments, the UAV may change its direction, altitude, or heading (or otherwise reposition the camera) such that the adjacent property would not be in a field of view or within range or a particular sensor. In some embodiments, a flight path or deviation may be modified or planned in such a manner as to avoid gathering surveillance data of the adjacent location (e.g., by approaching the surveillance location from a particular direction). If it is determined that it is possible to physically constrain the sensors without gathering surveillance data on the adjacent property (operation 606, "Yes"), surveillance data may be gathered at operation 608. If it is not possible to physically constrain the sensors to avoid gathering surveillance data of the adjacent property, processing continues to operation 610.

At 608, surveillance data may be gathered. Because a determination is made in 604 that an adjacent property is not present, or a determination is made in 606 that the sensors may be physically constrained, the surveillance data gathered in 608 may not include surveillance data corresponding to an adjacent property or excluded location 508, and may not need to be processed to generate geo-clipped data. In various examples, surveillance data may be any data gathered by the sensors 904, such as such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof.

At 610, a determination is made whether to perform pre- or post-processing to generate geo-clipped data. In some embodiments, pre-processing may be performed on the UAV, while in some embodiments, post-processing may be performed at the central controller 202, for example. In some embodiments, the processing to generate geo-clipped data may be within the processing capacity of the UAV, and accordingly a determination may be made to perform pre-processing (operation 610, "Pre"), while in some embodiments, the processing to generate geo-clipped data may be beyond the processing capacity or capability of a UAV, and accordingly, a determination may be made to perform post-processing (operation 610, "Post"). In some embodiments, the determination 610 to perform pre- or post-processing to generate geo-clipped data may depend on a type of adjacent property, a type of surveillance location, the available resources of the UAV, whether manual (human) review of the surveillance data is required, the type of surveillance data to be gathered (e.g., using the digital camera(s) 906, spectral camera(s) 908, or audio sensor(s) 910), the priority of the surveillance action, whether a surveillance event is detected, or whether real time geo-clipped data is requested.

At 612, surveillance data is gathered. In some embodiments, operation 612 may correspond to operations 308, 408, or 706 of FIGS. 3, 4, and 7, respectively. In various examples, surveillance data may be any data gathered by the sensors 904, such as such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof. As one non-limiting example, an example of surveillance data gathered in operation 612 may be the surveillance image 502 of FIG. 5. In the "post-processing" operation 612, gathering surveillance data may include surveillance data corresponding to an adjacent location, or an excluded location 508. In some embodiments, surveillance data gathered in operation 612 may not be presented to a user or service provider.

At 614, processing is performed to remove or obscure surveillance data to generate geo-clipped data. In some embodiments, operation 614 may correspond to operation 514 of FIG. 5 or operation 416 of FIG. 4, and the result of the processing 614 may be similar to geo-clipped image 516. In some embodiments, processing 614 may be performed by the UAV, while in some embodiments, the UAV may transmit the gathered surveillance data to the central controller 202, whereby the central controller 202 may perform processing 614. Following operation 614, in operation 620, the surveillance data or geo-clipped data is presented to a user or service provider.

Operations 612-614 and 616-620 may generate similar or the same geo-clipped data, but may do so in different ways. For example, as described above, post-processing to generate geo-clipped data includes removing or obscuring surveillance data after the surveillance data is gathered. In contrast, pre-processing to generate geo-clipped data includes processing to discard data before unauthorized surveillance data is stored in memory. In a sense, pre-processing operates by geo-clipping the surveillance data before the surveillance data is gathered. In this way, privacy issues may be avoided because no data is stored of an adjacent property or excluded location 508. Operations 616-620 are described in detail below.

At 616, using pre-processing, the operation includes receiving sensor data 616. In various examples, sensors may include sensors 904, such as such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof. At this point, sensor data may be stored temporarily (e.g., in volatile memory) or in a buffer.

At 618, processing determines whether the sensor data is within the geo-fence determined in operation 602. For example, the UAV may use sensors 904 such as GPS sensor(s) 914 and/or LIDAR/RADAR 912 to determine the UAV location relative to the geo-fence determined at operation 602. Further, the UAV may use LIDAR/RADAR 912 to map out the UAV surroundings and to identify objects captured by digital camera(s) 906 and/or spectral camera(s) 908. Based on the determined location of the UAV, the determined location of the geo-fence (including boundaries of the surveillance location, the excluded location, and any public spaces), and the identification of objects in received sensor data 616, operation 618 may determine whether the sensor data corresponds to surveillance data inside or outside of the geo-fence. In some embodiments, operation 618 is performed by a machine vision algorithm.

In some embodiments, the determination 618 whether sensor data is within a geo-fence may be based on a probability or confidence values, and different regions of sensor data may include different confidence values, such as low, medium, and high. For example, a high confidence value may represent a strong likelihood the sensor data is inside the geo-fence, and such data may be authorized data. A low confidence value may represent a strong likelihood that the sensor data is outside the geo-fence, and the data may be unauthorized data. A medium confidence level may reflect data near a boundary of the geo-fence, and may or may not be considered authorized data. In some examples, data labeled with a medium confidence level may be blurred or obscured in some manner before storing the data in memory. In some embodiments, operation 614 may use confidence levels in a similar manner to remove or obscure surveillance data, for example. In such an embodiment, the surveillance data may be segmented into a plurality of portions or regions, and a confidence value may be determined for each segmented portion or region. As would be understood by a person of ordinary skill in the art, the terms "inside," "outside," "authorized," and "unauthorized" are relative terms, and may be used in accordance with the scope of the disclosure. For example, a surveillance location may be "outside" or "inside" a geo-fence, just as the area "inside" or "outside" of a geo-fence may be designated as an "authorized" or "unauthorized" area.

At 620, authorized data is written into memory. In some embodiments, memory may correspond to data store 926 of UAV 902, or data store 210 of central controller 202. In some embodiments, unauthorized data is discarded, that is to say, unauthorized data is not stored in any memory beyond a cache or a buffer. In this manner, privacy issues may be avoided because unauthorized data may never be stored in permanent memory. As described above, data may be processed according to a confidence level, and some authorized data may be partially obscured and stored in memory. In some embodiments, geo-clipped data generated by operations 616-620 may be similar to the geo-clipped data generated by operations 612-614, and may be similar to the geo-clipped image 122, 516, or 520.

At 622, surveillance data or geo-clipped data may be presented. In some embodiments, operation 622 may correspond to operation 418 of FIG. 4.

In some embodiments, a combination operations described in connection with FIG. 6 (for example) may be used to gather surveillance data and generate geo-clipped data. As a non-limiting example, sensors may be physically constrained by planning the flight path of the UAV (e.g., by planning a surveillance action) to physically avoid an adjacent location and to be activated at a particular time to avoid gathering data of an adjacent location. Next, pre-processing to generate geo-clipped data may be used as a first pass to remove surveillance data where a confidence level is high that the data is unauthorized data. Further, post-processing may be used, either by a machine vision algorithm or by manual (human) review, to confirm that the geo-clipped data contains only authorized data.

Figure 7A:
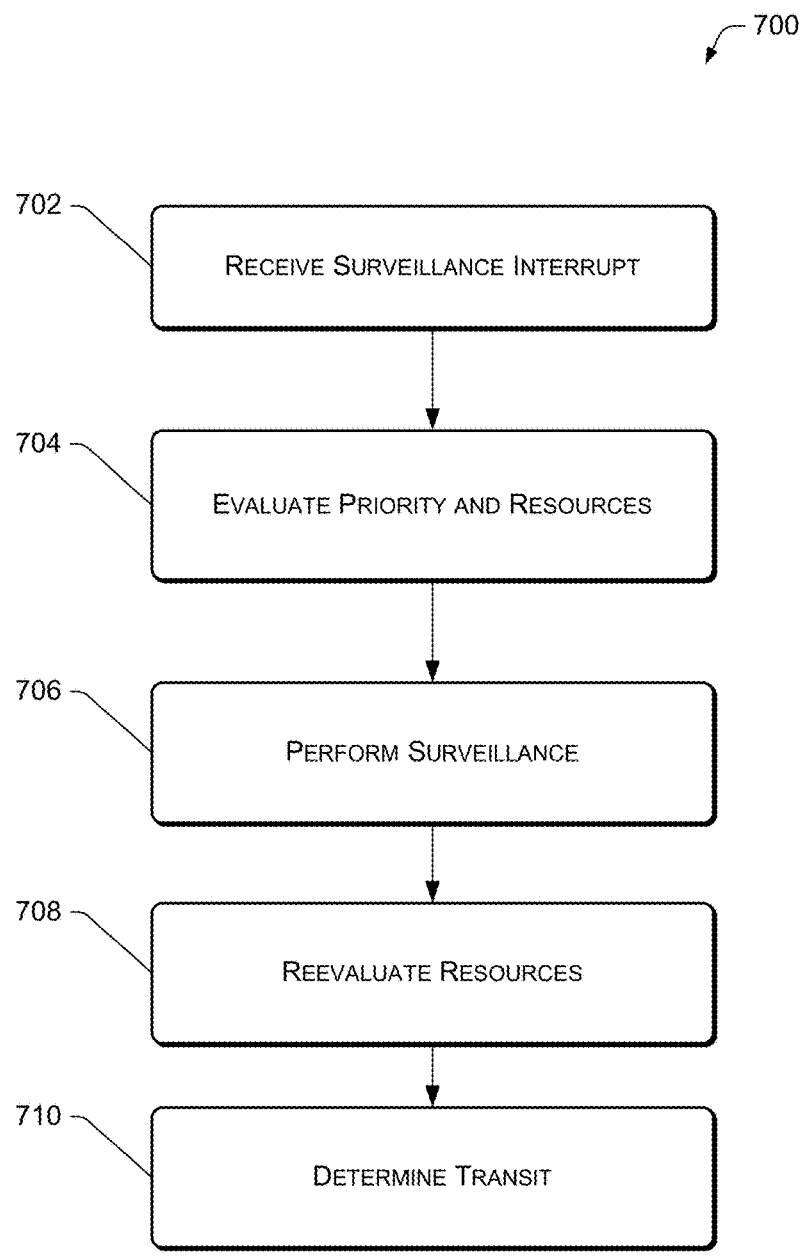
FIG. 7A is a flow diagram of an example process for processing an interrupt to perform a surveillance action.

FIG. 7A is a flow diagram of an example process 700 for processing an interrupt to perform a surveillance action. In some embodiments, operations 702-710 may be performed by a UAV, such as the UAV 104. In some embodiments, operations 702-710 may be performed by a surveillance system, such as the central controller 202, in combination with the UAV 104, as would be understood by a person of ordinary skill in the art. Some of the operations in the process 700 may be performed in parallel or possibly in a different order than the order shown in FIG. 7A.

At 702, a surveillance interrupt is received. In some embodiments, the surveillance interrupt is received by the UAV 104, while in some embodiments the surveillance interrupt is received by the central controller 202. As part of receiving the surveillance interrupt, the surveillance interrupt may be generated in various ways. For example, the surveillance interrupt may be generated based in part on a surveillance event, a surveillance alert, a request from a user or service provider, a surveillance scheduling module, or another UAV. In some embodiments, the surveillance interrupt may be generated by a voice-activated command device located at a surveillance location, while in some embodiments, a surveillance interrupt may be generated by a user device (e.g., a "mayday" feature). In some embodiments, the surveillance interrupt may be generated by a traditional home surveillance system. In some embodiments, the surveillance interrupt may be received by interfaces 934 of UAV 902 and/or interfaces 220 of the central controller 202.

At 704, a UAV may evaluate a priority of the surveillance interrupt and evaluate the UAV resources. In some embodiments, a surveillance interrupt may include a priority level, which indicates the urgency of performing the surveillance action. For example, if the UAV is en route to deliver a package, the priority level may indicate that the surveillance action should be performed before a delivery is to be performed. In another example, the priority level may indicate that the surveillance action should be performed after the delivery is to be performed. In some embodiments, evaluating the priority level of the surveillance interrupt is based in part on the resources of a UAV. For example, if there are sufficient resources (e.g., power, fuel, sensors, time, etc.) of a UAV such that the probability of performing both of the delivery and the surveillance action is high, the UAV may determine which action to perform based on the most efficient use of resources. However, if there are not sufficient resources of the UAV, such that the probability of performing both of the delivery and the surveillance action is low, the UAV may determine which action to perform based on the priority level of the surveillance interrupt. In some embodiments, the probability of performing both the delivery and the surveillance action may be continuously determined until a decision must be made, based on the evaluated resources of the UAV and the most efficient use of the resources. In some embodiments, evaluating remaining resources may correspond to the operation of determining resources in operation 304 and/or operation 404.

At 706, surveillance is performed. In various examples, surveillance data may be any data gathered by sensors 904, such as such as digital camera(s) 906, spectral camera(s) 908, audio sensor(s) 910, LIDAR/RADAR 912, GPS sensor(s) 914, chemical sensor(s) 916, flight/delivery sensor(s) 918, or any combination thereof.

At 708, the resources of the UAV may be reevaluated. For example, because the surveillance action at 706 may have used UAV resources (e.g., power, fuel, memory, time, etc.), the resources of the UAV may be reevaluated. In some embodiments, reevaluating remaining resources may correspond to the operation of determining resources in operation 304 and/or operation 404.

Based in part on the remaining resources reevaluated at 708, at 710, a flight path is determined. For example, if a delivery was postponed by the surveillance interrupt, and a UAV has sufficient resources to continue with the delivery, a flight path is determined to continue with the delivery. If the UAV does not have sufficient resources to perform the delivery, the UAV may return to an origination location without performing the delivery.

Figure 7B:
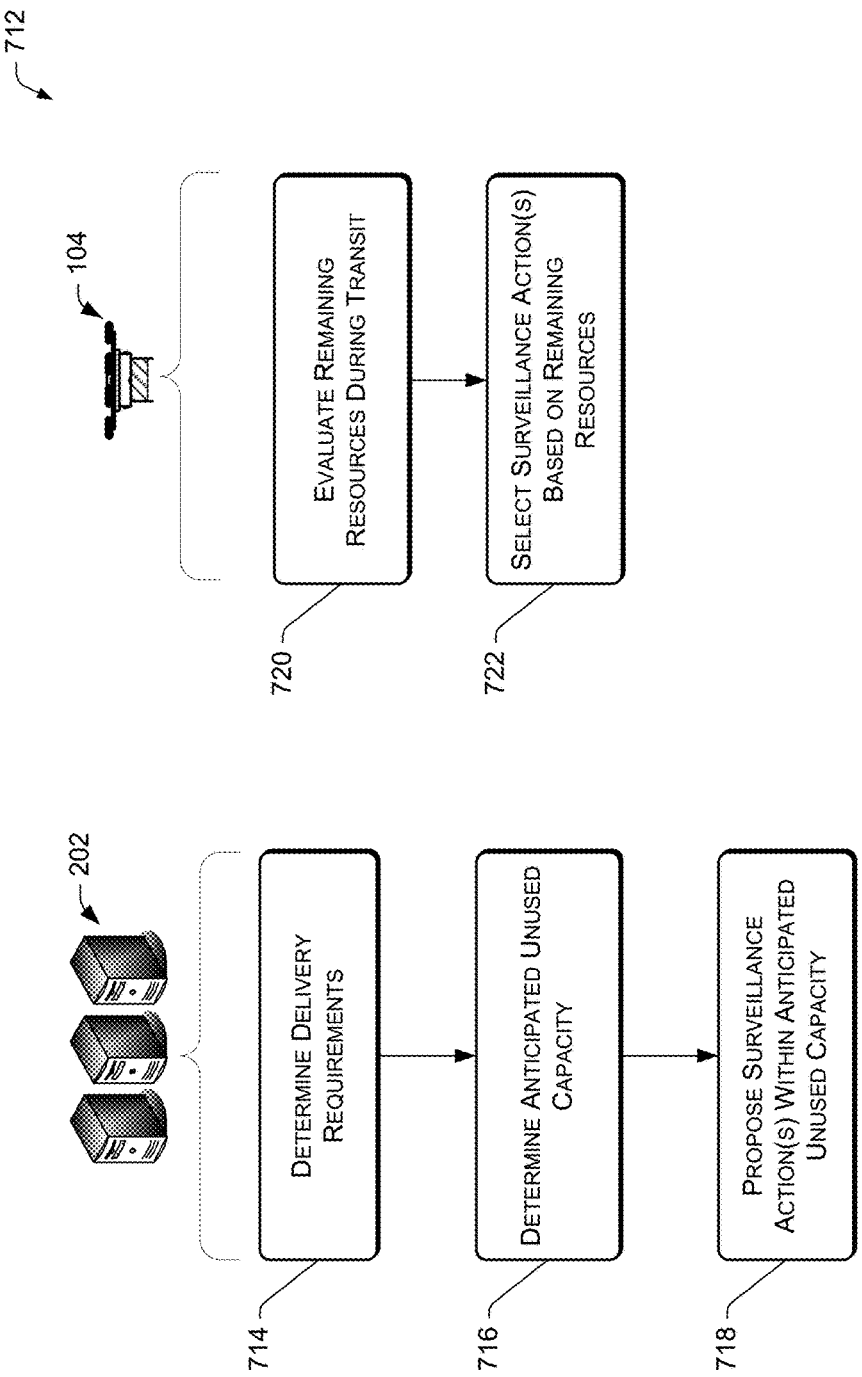
FIG. 7B is a flow diagram of an example process for selecting a surveillance action.

FIG. 7B is a flow diagram of an example process 712 for selecting a surveillance action. In some embodiments, operations 714-718 may be performed by a surveillance system, such as central controller 202. In some embodiments, operations 720 and 722 may be performed by a UAV such as UAV 104. In some embodiments, central controller 202 may perform operations 714-722, UAV 104 may perform operations 714-722, or UAV 104 and central controller 202 may perform operations 714-722 in any combination, as would be understood by a person of ordinary skill in the art. Some of the operations in the process 712 may be performed in parallel or possibly in a different order than the order shown in FIG. 7B.

At 714, the central controller 202 may determine delivery requirements. For example, for each delivery, the central controller 202 may determine the characteristics of a package (e.g., size, weight, or environmental requirements (such as temperature, humidity, etc.)), a destination location, an origination location, and environmental factors such as weather, to determine the delivery requirements.

At 716, the central controller 202 may determine an anticipated unused capacity of a UAV. A UAV has finite resources, such as range, or an available amount of time in which a UAV may perform a delivery or return from a delivery. The central controller 202 determines an anticipated unused capacity based in part on the delivery requirements determined in operation 714. An anticipated unused capacity may also be based in part on environmental factors such as weather, as well as the location of various origins and destinations of a UAV.

At 718, one or more surveillance actions may be proposed within the anticipated unused capacity determined in operation 716. For each surveillance action to be proposed, a resource requirement, including a power requirement, a time requirement, or a sensor requirement, may be determined. In some embodiments, a plurality of surveillance actions may be proposed for a plurality of surveillance locations. In such an embodiment, a non-limiting example may include a proposal for a first surveillance action at a first location and a second surveillance action at a second location. In some embodiments, one or more surveillance actions may be proposed for each of the plurality of surveillance locations, with various levels of surveillance distinguishing the various surveillance actions. In such an embodiment, a non-limiting example may include a proposal for a first surveillance action and a second surveillance action to be performed at a first surveillance location, with the first and second surveillance actions varying in a surveillance depth. The surveillance depth may be based on the amount of resources allocated for a surveillance action, such as UAV loitering time, surveillance altitude, surveillance speed, type(s) of sensors used, surveillance data processing requested, and a priority of a surveillance action. In some embodiments, if operations 714-722 are performed in a distributed manner, the results of any operations may be communicated to any component of the system. For example, the central controller 202 may transmit the proposed surveillance actions to the UAV 104.

At 720, the UAV 104 may evaluate its remaining resources during transit. Operation 720 may be performed at any time, for example, before, during or after a delivery of a package. In some embodiments, operation 720 of evaluating the remaining resources during transit includes determining a remaining range of a UAV based on the current flight characteristics, environmental conditions, anticipated flight characteristics, and/or historical flight characteristics. In some embodiments, evaluating remaining resources during transit 720 may correspond to the operation of determining resources in operation 304 and/or operation 404.

At 722, the UAV 104 may select one or more surveillance actions based on the remaining resources evaluated in operation 720. The one or more surveillance actions may be selected from the surveillance actions proposed by the central controller 202 in operation 718. The selection in operation 722 may be based in part on factors such as a priority of a surveillance action, a maximization of resources remaining after the surveillance action, a maximization of surveillance actions to be performed, a previously-performed surveillance action, or a surveillance action to be performed in the future. For example, the UAV 104 may coordinate with other UAVs to maximize the number of surveillance actions that may be performed by a fleet of UAVs. In some embodiments, surveillance actions may be selected dynamically and/or in real time based in part on the location of individual UAVs of a fleet of UAVs, as well as a surveillance action optimization algorithm.

Figure 8:
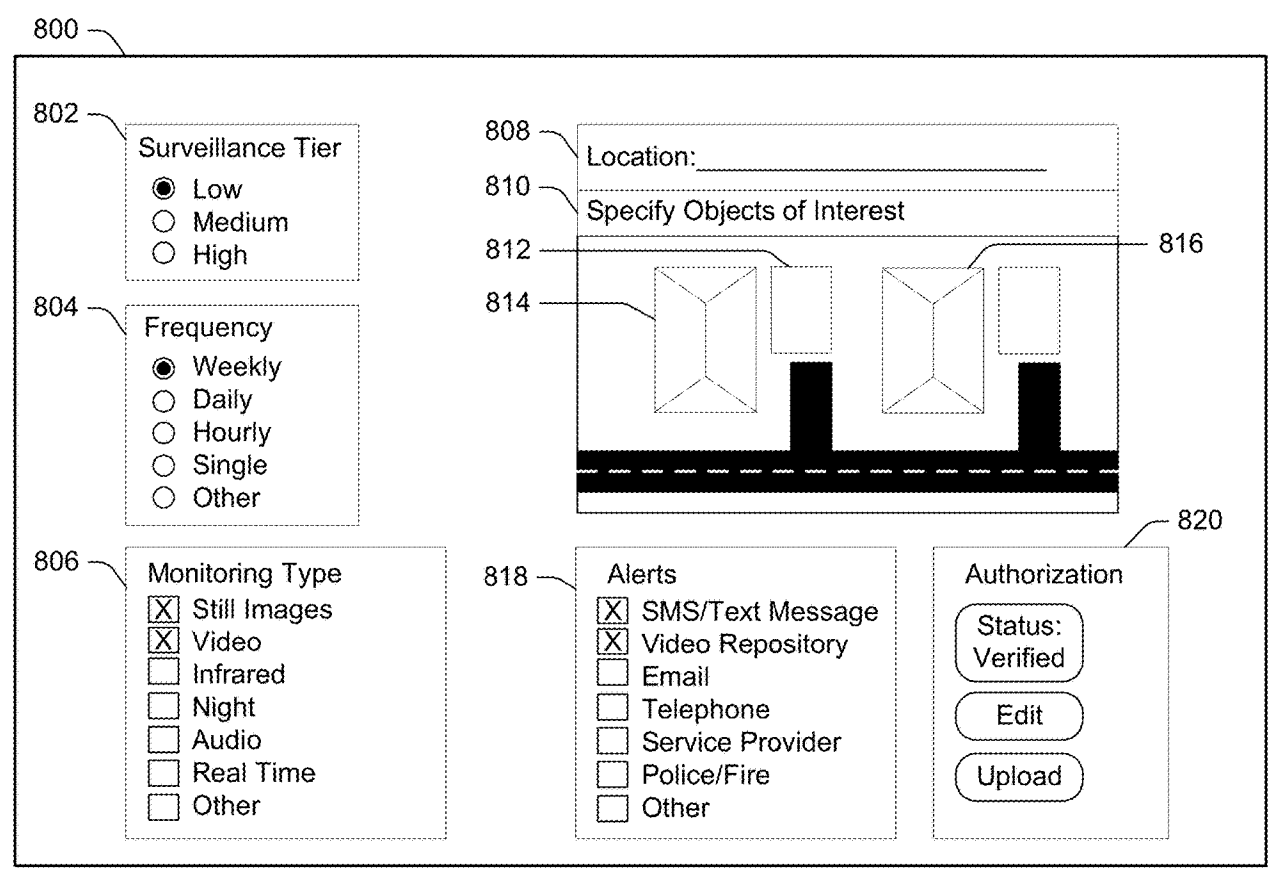

FIG. 8 is an illustrative user interface 800 associated with determining parameters of a surveillance system. The user interface 800 may be provided on a user device such as a computer or mobile device. The user interface 800 may be used to register a user, enter and modify surveillance parameters, review surveillance data, and receive and manage surveillance alerts. User interface 800 may be hosted in the surveillance subscription module 216, a dedicated server, or a user device, as would be understood by a person of ordinary skill in the art. Furthermore, the user interface 800 may be configured in any manner, as would be understood by a person of ordinary skill in the art.

The user interface 800 includes a surveillance tier selection 802. This selection allows a user to choose a desired surveillance tier, such as low, medium, or high. In some non-limiting embodiments, selecting a radio button for a surveillance tier provides default settings for other parameters. For example, a "Low" surveillance tier may include by default parameters including a low frequency (e.g., weekly), minimal monitoring types (e.g., still images), and minimal alerts (e.g., email only). In other examples, a "Medium" surveillance tier may include by default parameters including a higher frequency (e.g., daily), a wider selection of monitoring types (e.g., still images and video), and a wider selection of alerts (e.g., SMS/text messaging, video repository, and email). In other examples, a "High" surveillance tier provides the maximum amount of surveillance and options to a user. In some embodiments, selecting a surveillance tier removes surveillance options from the user interface 800, and in some embodiments, selecting a surveillance tier greys out surveillance options from the user interface. In other examples, the selection of a surveillance tier determines the depth of surveillance, such the amount of resources allocated on a surveillance action, including UAV loitering time, surveillance altitude, surveillance speed, type(s) of sensors used, surveillance data processing requested, and priority. In other examples, pricing of the surveillance service is based in part on the selected surveillance tier.

Field 804 in the user interface 800 allows for a selection of a surveillance frequency. For example, the surveillance frequency may be selected such that surveillance actions are conducted weekly, daily, hourly, singly, or in some other determined fashion. In some embodiments, selecting a frequency of "single" allows a user to specify the exact time, or a window of time, for the surveillance action to be performed. In some embodiments, selecting a frequency of "other" allows a user to specify irregular intervals, for example.

Field 806 in the user interface 800 allows for a selection of a surveillance monitoring type. Non-limiting examples in the field 806 include "Still Images," "Video," "Infrared," "Night," "Audio," "Real Time," and "Other." In some embodiments, the options for monitoring type may depend on the types of available sensors in a UAV. The field 806 may allow for the selection of multiple monitoring types.

Field 808 allows for a surveillance location to be specified. For example, an address of a surveillance location could be input into field 808. In some embodiments, the address of a surveillance location may correspond to the address or location of a GPS-enabled device, such as a smartphone or a car. In some embodiments, a user must submit proof of ownership or control of the surveillance location receiving surveillance, and possibly consent of other people residing at that location. When the user is verified as owning or controlling the property, they may be considered an authorized party. If a user cannot verify they are an authorized party, the surveillance location may be rejected and/or a surveillance location may not be performed at that surveillance location.

In response to inputting an address in the field 808, field 810 may provide an image of a surveillance location corresponding to the address in the field 808. In some embodiments, the image provided in the field 810 may include a satellite photo of the surveillance location. In some embodiments, the image provided in the field 810 may include an abstract representation of the surveillance location. In some embodiments, the image provided in the field 810 may include metadata about the objects in the image, such as an address, a street name, and/or a proposed geo-fence.

The field 810 may include a function to specify objects of interest. In some embodiments, the field 810 displays a surveillance location house 814, a surveillance location garage 812, and an excluded location house 816. In some embodiments, the field 810 may provide an indication of the geo-fence associated with the surveillance location house

814. In some embodiments, the field 810 allows for a selection of an object of interest. Such a selection may include using a mouse, a pointer, or other graphical user interface input (e.g., a finger or stylus, in the case of a touch screen) to select a region or object within the field 810. By identifying a region or an object as an object of interest, a surveillance action associated with this surveillance location prioritize resources to gathering surveillance data corresponding to the identified region or object, such as planning a surveillance action to provide flight paths or perspectives conducive for imaging the region or object. In some embodiments, if a region or an object is identified that is outside of the surveillance location (or geo-fence, if available) as an object of interest, the user interface 800 may prohibit that region or object from being selected. In other embodiments, if an object of interest is determined to be outside the surveillance location, a request may be made (e.g., by a user to the central controller 202) to reevaluate the boundaries of the surveillance location. In some embodiments, a user must submit proof of ownership or control of the surveillance location receiving surveillance, and possibly consent of other people residing at that location. In some embodiments, a user must provide authentication that he or she is associated with the surveillance location, such as by providing a lease, a utility bill, or other property records. In some embodiments, authentication may be provided via a billing address or a shipping address associated with a user account. In some embodiments, an object of interest may be specified after surveillance data has been gathered. For example, a user may receive geo-clipped surveillance data of a surveillance location and mark or specify an object of interest within the geo-clipped surveillance data.

In field 818 of user interface 800, alerts may be specified for the surveillance system. Non-limiting examples of alerts include SMS (Short Message Service)/Text Messaging, Video Repository, Email, Telephone, Service Provider, Police/Fire, and Other. In some embodiments, one or more alerts may be specified. When a surveillance event has been detected (or the probability of the surveillance event is above a threshold probability), an alert may be generated. A process for determining surveillance events and generating alerts was discussed above in connection with processes 424 and 426 of FIG. 4. In some embodiments, the surveillance data provided in an alert may be geo-clipped surveillance data (such as still images or video), and in some embodiments, the surveillance data may be analyzed and/or edited by a machine vision algorithm to present information relating to or indicating a surveillance event.

For a SMS/Text Message alert in the field 818, an alert may be provided via text messaging. As non-limiting examples, such an alert may include geo-clipped images and/or videos, a textual description of a surveillance event, audio information, or a hyperlink to a webpage providing more information about a surveillance event.

For a Video Repository alert in the field 818, surveillance data may be stored in a data repository and provided to a user via a webpage. In some embodiments, geo-clipped images and/or videos may be provided via the Video Repository. As non-limiting examples, the Video Repository may be provided by the central controller 202, and accessed as a webpage using an internet browser, or may be provided as a surveillance application.

For an Email alert in the field 818, an email may be provided to one or more email addresses. As non-limiting examples, such an alert may include geo-clipped images and/or videos, a textual description of a surveillance event, audio information, or a hyperlink to a webpage providing more information about a surveillance event.

For a Telephone alert in the field 818, a telephone call may be provided by an automated caller or an operator indicating a surveillance event.

For a Service Provider alert in the field 818, a user may wish to provide alerts to a service provider, such as a security company. For example, the system provided by the central controller 202 may be provided in addition to or in conjunction with a security company. If a surveillance event is detected, a service provider may be alerted, for example, to dispatch surveillance personnel to verify or investigate a surveillance event.

A Police/Fire alert may be generated for certain events, such an accident, break-in, or fire. In some embodiments, a Police/Fire alert may not be selected in user interface 800, but may be invoked under certain default circumstances.

Additionally, the field 818 includes an option for an "Other" alert. Here, the alert may be specified by the user.

In field 820 of user interface 800, information may be provided relating to the authorization of the surveillance location. In some embodiments, a user must submit proof of ownership or control of the surveillance location receiving surveillance, and possibly consent of other people residing at that location. When the user is verified as owning or controlling the property, they may be considered an authorized party. If a user cannot verify they are an authorized party, the surveillance location may be rejected and/or a surveillance location may not be performed at that surveillance location. In another example, while a landlord may own a property, the landlord may not live at the property, and may not be considered an authorized party if the tenants do not consent to any surveillance action. Field 820 may display the status of an authorization for a surveillance location or a surveillance action. In some embodiments, field 820 may include fields to upload information to provide documentation that a user is an authorized party (such as a lease or property records), or may include fields to edit information relating to a user's authorization.

Figure 9:
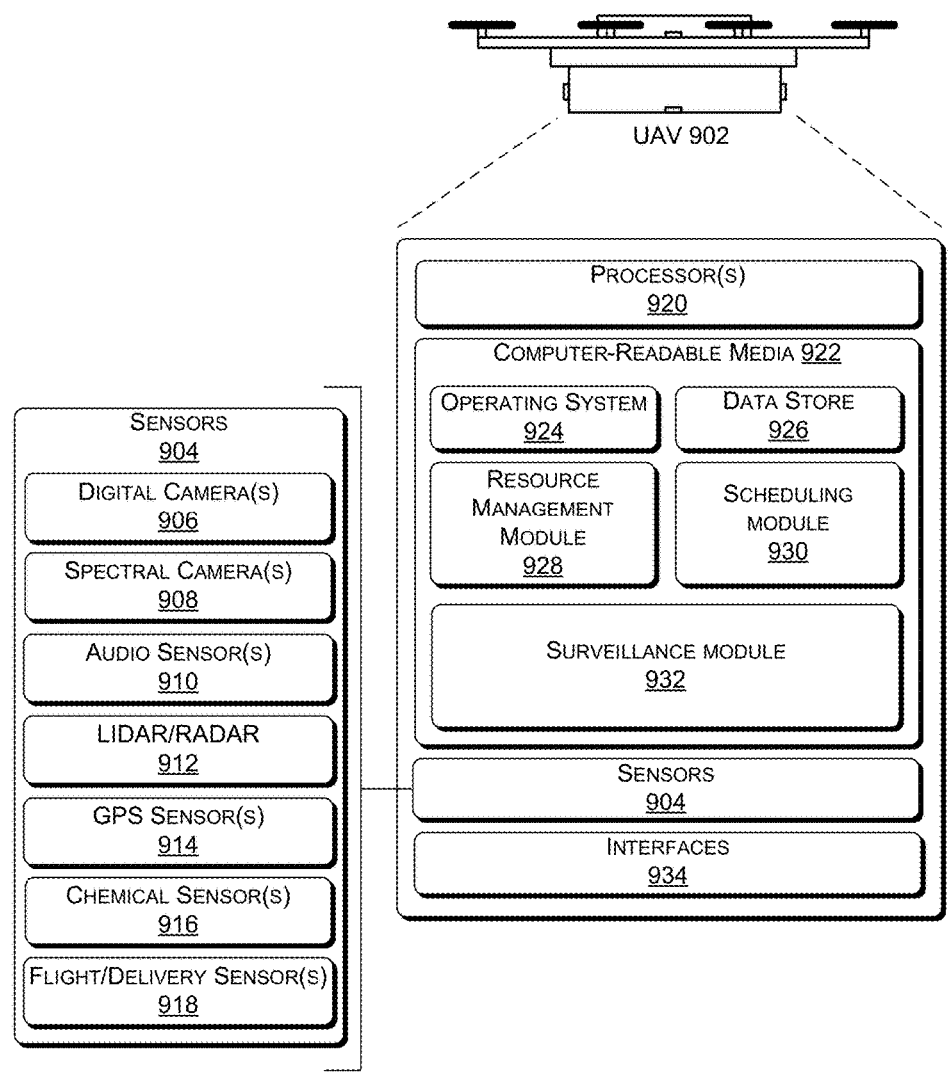
FIG. 9 is a block diagram of components of an example unmanned aerial vehicle that is supported by the surveillance system.

FIG. 9 illustrates an example UAV 902 that is supported by the central controller 202. In various examples, the UAV 902 can correspond to the UAV 104. The UAV 902 may be equipped with sensors 904 that perform surveillance actions, and monitor the operation and functionality of the physical structures and the physical systems of the UAV 902. In some embodiments, the sensors 904 gather surveillance data during a surveillance action. The sensors 904 can include, but are not limited to, digital camera(s) 906, spectral camera(s) 908, audio sensor(s) 910, LIDAR/RADAR 912, global positioning system (GPS) sensor(s) 914, chemical sensor(s) 916, and flight/delivery sensor(s) 918.

In various embodiments, the digital camera(s) 906 can be used to provide imaging for the UAV 902 during flight and/or during a surveillance action. For example, the digital camera(s) 906 can be used to provide real time still images or real time video of a surveillance location. In some embodiments, the digital camera(s) 906 may include stereoscopic cameras with varying focal lengths to provide three dimensional images. For example, when viewing a stereoscopic image produced by the digital camera(s) 906, the portions of an image closer to the digital camera(s) 906 may be in focus, while the portions of the image further away from the digital camera(s) 906 may be blurry. In some embodiments, the digital camera(s) 906 may be used for machine vision, navigation, etc.

In some embodiments, the spectral camera(s) 908 may provide infrared imaging, near-infrared imaging, thermal imaging, and/or night vision imaging. In some embodiments, the spectral camera(s) 908 may provide still images and/or video imaging capabilities. In some embodiments, the spectral camera(s) 908 and/or the digital camera(s) 906 can be used together to provide multi-dimensional (and/or multi-layered) surveillance images representing a variety of light spectrums. For example, a surveillance action may use the digital camera(s) 906 to identify a broken window at a surveillance location, and the spectral camera(s) 908 may be used to identify a person inside of a building, while combining the data into a multi-dimensional or multi-layered image. In some embodiments, the spectral camera(s) 908 can be used to provide a thermal image of a building, for example, to determine the energy efficiency of the building.

In some embodiments, the audio sensor(s) 910 can be used to detect noise at a surveillance location. The audio sensor(s) 910 may include filters and/or audio processing to compensate for noise generated by the UAV 902.

In various examples, the LIDAR/RADAR 912 (laser illuminated detection and ranging/radio detection and ranging) may provide detection, identification, and precision measurement of a distance to a surveillance target. For example, the LIDAR/RADAR 912 may provide accurate mapping of a surveillance location, and/or determination of the location of an object of interest. In some embodiments, the LIDAR/RADAR 912 may be used in part to determine the location of the UAV 902 relative to a geo-fence, such as the geo-fence 120. In various embodiments, the LIDAR/RADAR 912 may be used to provide navigation of the UAV 902, in conjunction with other of the sensors 904.

In some embodiments, the global positioning system (GPS) sensor(s) 914 may provide location and time information to the UAV 902. For example, the GPS sensor(s) 914 may provide metadata to the digital camera(s) 906 and the spectral camera(s) 908 as the location of the UAV when an image is generated. An example of such metadata may be the metadata 512 in FIG. 5A. In some embodiments, the GPS sensor(s) 914 may be used in generating geo-clipped surveillance data, such as a geo-clipped image or video.

In some embodiments, the chemical sensor(s) 916 can be used to measure the presence of various chemicals in the air. For example, the chemical sensor(s) 916 can be used to detect chemicals to determine the presence fire, or may be used to detect a chemical leak.

In some embodiments, the flight/delivery sensor(s) 918 may include accelerometer(s), gyroscope(s), proximity sensor(s), temperature sensor(s), moisture sensor(s), voltage sensor(s), current sensor(s), and strain gauge(s). In some embodiments, the flight/delivery sensor(s) 918 may provide support to the UAV 902 physical systems. In some embodiments, data from the flight/delivery sensor(s) 918 may be used in conjunction with surveillance data, for example, in generating geo-clipped surveillance data.

In some embodiments, the UAV 902 can include one or more processor(s) 920 operably connected to computer-readable media 922. The UAV 902 can also include one or more interfaces 934 to enable communication between the UAV 902 and other networked devices, such as the central controller 202, a surveillance location, a service provider, a user device, or other UAVs. The one or more interfaces 934 can include network interface controllers (NICs), I/O interfaces, or other types of transceiver devices to send and receive communications over a network. For simplicity, other computers are omitted from the illustrated UAV 902.

The computer-readable media 922 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the processor(s) 920 and the computer readable media 922 can correspond to the processor(s) 204 and computer-readable media 206 associated with the central controller 202.

In some embodiments, the computer-readable media 922 can include an operating system 924 and a data store 926. The data store 926 may be used to locally store sensor data that corresponds to the sensor 904 data. As non-limiting examples, the data store 926 may store surveillance data, data relating to delivery actions and surveillance actions, and scheduling information.

In various examples, the computer-readable media 922 can include a resource management module 928. The resource management module 928 can monitor the resources of the UAV 902. In some embodiments, resources to be monitored include total resources, used resources, and available resources. Resource management module 928 may also monitor historical resource usage and compare predicted resources with resources actually used. In some embodiments, resources may include a power resource (e.g., battery power or fuel levels indicating the range of the UAV), a sensor resource indicating the available sensors of a UAV (e.g., a digital camera, an available memory available to store surveillance data, or a communication capability), or a time resource indicating a time constraint (e.g., a time constraint to deliver a package, perform a surveillance action, return to an origin, or a subsequent delivery and/or surveillance action). In some embodiments, the resource management module 928 may be configured to determine the resources required by a delivery action, and/or determine the resources required by a surveillance action. In some embodiments, the determination is based in part on environmental factors such as the weather, including wind speed, direction, a weather forecast, temperature, time, ambient light, etc. In some embodiments, determining the resources may also include determining a priority of a resource, a delivery action, or a surveillance action. In some embodiments, the resource management module 928 may perform operations of evaluating remaining resources as described in operation 304 and operation 404, or example.

In various examples, the computer-readable media 922 can include a scheduling module 930. The scheduling module 930 can provide scheduling of a delivery action and a surveillance action of a UAV. In some embodiments, the UAV may receive one or more delivery actions and one or more surveillance actions from the central controller 202. In some embodiments, the scheduling module 930 includes a priority of a delivery action and/or a priority of a surveillance action. In some embodiments, the surveillance module 930 receives a surveillance interrupt and determines a schedule based on the priority of a delivery action and/or a surveillance action.

In various embodiments, the scheduling module 930 can correspond to the delivery scheduling module 212 and/or surveillance scheduling module 214 of the central controller 202. The functionality of the scheduling module 930 is substantially identical to the delivery scheduling module 212 and/or the surveillance scheduling module 214. In some embodiments, the scheduling module 930 receives scheduling information from the delivery scheduling module 212 and/or the surveillance scheduling module 214. In other embodiments, the scheduling module 930, the delivery scheduling module 212, and/or the surveillance scheduling module 214 may operate simultaneously. In this instance, the processing derived by either one of the scheduling module 930, the delivery scheduling module 212, and/or the surveillance scheduling module 214 can be used to check the processing determined by the other. In various examples, the scheduling of deliveries and/or surveillance actions solely by the either the scheduling module 930, the delivery scheduling module 212, or the surveillance scheduling module 214, or in any combination. In some embodiments, the scheduling module 930 may perform all scheduling processes described herein, including the scheduling processes described in connection with the figures of this disclosure.

In various examples, the computer-readable media 922 can include a surveillance module 932. In some embodiments, the surveillance module 932 may control the sensors 904 of the UAV 902 to perform surveillance actions. In some embodiments, the surveillance module 932 receives sensor data from the sensors 904 as surveillance data and may modify the surveillance data to generate geo-clipped surveillance data. In some embodiments, the surveillance module 932 includes a machine vision algorithm that registers surveillance data, compares surveillance data, determines the probability of a surveillance event, and generates one or more alerts of the surveillance event. In some embodiments, the surveillance module 932 can include processing as described connection with the figures of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method to facilitate a delivery of a package using an unmanned aerial vehicle (UAV), the method comprising:
dispatching the UAV to travel from an origination location to deliver the package at a destination location;
determining one or more remaining resources of the UAV after the delivery of the package at the destination location;
receiving a list of surveillance locations and one or more surveillance actions to be performed at each surveillance location in the list of surveillance locations;
determining one or more anticipated resources expected to be used to perform at least one surveillance action of the one or more surveillance actions;
determining that the one or more remaining resources is greater than or equal to the one or more anticipated resources;
scheduling the at least one surveillance action to be performed by the UAV based at least in part on the one or more remaining resources being greater than or equal to the one or more anticipated resources;
determining, based at least in part on scheduling the at least one surveillance action, a first surveillance location from the list of surveillance locations and one or more first surveillance actions at the first surveillance location, the one or more first surveillance actions including causing the UAV to deviate from a direct return path between the destination location and the origination location and to capture imagery, using a camera, of a property at the first surveillance location for an authorized party that is verified as owning or controlling the property;
assigning the at least one surveillance action to be performed by the UAV;
receiving the imagery captured by the UAV, the imagery depicting the property and an adjacent property;
modifying the imagery to at least obscure or remove depictions of the adjacent property while maintaining the imagery of the property;
detecting a surveillance event at the property;
creating a surveillance alert; and
sending the surveillance alert to an electronic device associated with an owner of the first surveillance location.

2. The method of claim 1, the modifying further comprising:
determining a boundary defining the property of the authorized party; and
obscuring or removing a portion of the imagery corresponding to an area outside of the boundary defining the property of the authorized party to generate geo-clipped surveillance data.

3. The method of claim 1, wherein the determining the one or more remaining resources of the UAV further comprises determining at least one of a remaining power resource, a time resource, or a sensor resource of the UAV; and
wherein scheduling the at least one surveillance action to be performed by the UAV further comprises selecting the at least one surveillance action from the one or more surveillance actions based in part on a priority of each surveillance action and an amount of resources required by each surveillance action.

4. The method of claim 1, further comprising:
analyzing the imagery captured by the UAV;
determining a confidence value associated with the surveillance event based in part on the analyzing the imagery captured by the UAV; and
generating the surveillance alert for the surveillance event in response to the confidence value being above a threshold.

5. The method of claim 1, further comprising:
receiving one or more surveillance parameters from a user interface, the one or more surveillance parameters including at least one of:
a surveillance tier indicating a level of surveillance;
a monitoring type indicating a type of surveillance data to be gathered;
a frequency indicating a frequency of conducting surveillance; or
an alert indicating a method of presenting surveillance data to a user; and
wherein the assigning the at least one surveillance action to be performed by the UAV is based in part on the one or more surveillance parameters.

6. A system comprising:
one or more processors; and
memory coupled to the one or more processors, the memory including one or more instructions that when executed by the one or more processors, cause the one or more processors to perform acts comprising:
dispatching a UAV to travel from an origination location to deliver a package at a destination location;

determining one or more remaining resources of the UAV after delivery of the package at the destination location;

receiving a list of surveillance locations and one or more surveillance actions to be performed at an individual surveillance location in the list of surveillance locations;

determining one or more anticipated resources associated with at least one surveillance action of the one or more surveillance actions;

determining that the one or more remaining resources is greater than or equal to the one or more anticipated resources;

scheduling the at least one surveillance action to be performed by the UAV based at least in part on the one or more remaining resources being greater than or equal to the one or more anticipated resources;

determining, based at least in part on scheduling the at least one surveillance action, a first surveillance location in the list of surveillance locations and one or more first surveillance actions at the first surveillance location, the one or more first surveillance actions comprising:

causing the UAV to deviate from a direct return path between the destination location and the origination location; and causing the UAV to capture imagery of a property at the first surveillance location for an authorized party that is verified as owning or controlling the property;

assigning the at least one surveillance action to be performed by the UAV;

receiving the imagery captured by the UAV, the imagery depicting the property and an adjacent property;

modifying the imagery to at least one of obscure or remove depictions of the adjacent property;

detecting a surveillance event at the property;

creating a surveillance alert; and sending the surveillance alert to an electronic device associated with an owner of the first surveillance location.

7. The system of claim 6, wherein the list of surveillance locations and the one or more surveillance actions is received from the owner of the first surveillance location.

8. The system of claim 6, wherein modifying the imagery comprises:

determining a boundary defining the property of the authorized party; and obscuring or removing a portion of the imagery corresponding to an area outside of the boundary defining the property of the authorized party to generate geo-clipped surveillance data.

9. The system of claim 6, wherein the acts further comprise:

generating surveillance data from the at least one surveillance action; and transmitting the surveillance data.

10. The system of claim 6, wherein at least one of the one or more remaining resources comprises at least one of:

a power resource indicating at least one of a remaining amount of a battery power or fuel of the UAV; or a sensor resource indicating at an availability of at least one sensor of the UAV.

11. The system of claim 6, wherein the acts further comprise:

determining a priority level of the at least one surveillance action; and wherein assigning the at least one surveillance action is based at least in part on the priority level.

12. The system of claim 6, wherein the determining the one or more remaining resources of the UAV further comprises:

determining at least one of a remaining power resource, a time resource, or a sensor resource of the UAV; and wherein scheduling the at least one surveillance action to be performed by the UAV further comprises selecting the at least one surveillance action from the one or more surveillance actions based in part on a priority of each surveillance action and an amount of resources required by each surveillance action.

13. The system of claim 6, wherein the acts further comprise:

analyzing the imagery captured by the UAV;

determining a confidence value associated with the surveillance event based in part on the analyzing the imagery captured by the UAV; and generating the surveillance alert for the surveillance event in response to the confidence value being above a threshold.

14. A non-transitory computer-readable medium storing instructions executable by one or more processors, wherein the instructions, when executed, cause the one or more processors to perform operations comprising:

dispatching a UAV to travel from an origination location to deliver a package at a destination location;

determining one or more remaining resources of the UAV after delivery of the package at the destination location;

receiving a list of surveillance locations and one or more surveillance actions to be performed at an individual surveillance location in the list of surveillance locations;

determining one or more anticipated resources associated with at least one surveillance action of the one or more surveillance actions;

determining that the one or more remaining resources is greater than or equal to the one or more anticipated resources;

scheduling the at least one surveillance action to be performed by the UAV based at least in part on the one or more remaining resources being greater than or equal to the one or more anticipated resources;

determining, based at least in part on scheduling the at least one surveillance action, a first surveillance location in the list of surveillance locations and one or more first surveillance actions at the first surveillance location, the one or more first surveillance actions comprising:

causing the UAV to deviate from a direct return path between the destination location and the origination location; and causing the UAV to capture imagery of a property at the first surveillance location for an authorized party that is verified as owning or controlling the property;

assigning the at least one surveillance action to be performed by the UAV;

receiving the imagery captured by the UAV, the imagery depicting the property and an adjacent property;

modifying the imagery to at least one of obscure or remove depictions of the adjacent property;

detecting a surveillance event at the property;

creating a surveillance alert; and sending the surveillance alert to an electronic device associated with an owner of the first surveillance location.

15. The non-transitory computer-readable medium of claim 14, wherein modifying the imagery comprises:
- determining a boundary defining the property of the authorized party; and
- obscuring or removing a portion of the imagery corresponding to an area outside of the boundary defining the property of the authorized party to generate geo-clipped surveillance data.

16. The non-transitory computer-readable medium of claim 14, wherein at least one of the one or more remaining resources comprises at least one of:
- a power resource indicating at least one of a remaining amount of a battery power or fuel of the UAV; or
- a sensor resource indicating at an availability of at least one sensor of the UAV.

17. The non-transitory computer-readable medium of claim 14, wherein the operations further comprise:
- determining a priority level of the at least one surveillance action; and
- wherein assigning the at least one surveillance action is based at least in part on the priority level.

18. The non-transitory computer-readable medium of claim 14, wherein the determining the one or more remaining resources of the UAV further comprises:
- determining at least one of a remaining power resource, a time resource, or a sensor resource of the UAV; and
- wherein scheduling the at least one surveillance action to be performed by the UAV further comprises selecting the at least one surveillance action from the one or more surveillance actions based in part on a priority of each surveillance action and an amount of resources required by each surveillance action.

19. The non-transitory computer-readable medium of claim 14, wherein the operations further comprise:
- analyzing the imagery captured by the UAV;
- determining a confidence value associated with the surveillance event based in part on the analyzing the imagery captured by the UAV; and
- generating the surveillance alert for the surveillance event in response to the confidence value being above a threshold.

20. The non-transitory computer-readable medium of claim 14, wherein the operations further comprise:
- receiving one or more surveillance parameters from a user interface, the one or more surveillance parameters including at least one of:
  - a surveillance tier indicating a level of surveillance;
  - a monitoring type indicating a type of surveillance data to be gathered;
  - a frequency indicating a frequency of conducting surveillance; or
  - an alert indicating a method of presenting surveillance data to a user; and
- wherein the assigning the at least one surveillance action to be performed by the UAV is based in part on the one or more surveillance parameters.

* * * * *